US006524348B1

(12) United States Patent
Jewell et al.

(10) Patent No.: US 6,524,348 B1
(45) Date of Patent: Feb. 25, 2003

(54) METHOD OF MAKING CARBOXYLATED CELLULOSE FIBERS AND PRODUCTS OF THE METHOD

(75) Inventors: Richard A. Jewell, Bellevue, WA (US); Joseph Lincoln Komen, Bothell, WA (US); Bing Su, Federal Way, WA (US); S. Ananda Weerawarna, Seattle, WA (US); Yong Li, Tacoma, WA (US)

(73) Assignee: Weyerhaeuser Company, Federal Way, WA (US)

( * ) Notice: Subject to any disclaimer, the term of this patent is extended or adjusted under 35 U.S.C. 154(b) by 218 days.

(21) Appl. No.: 09/641,276

(22) Filed: Aug. 17, 2000

Related U.S. Application Data

(63) Continuation-in-part of application No. 09/418,909, filed on Oct. 15, 1999, now Pat. No. 6,379,494, which is a continuation-in-part of application No. 09/272,137, filed on Mar. 19, 1999, now abandoned.

(51) Int. Cl.[7] .......................... D06M 23/00; D21C 9/00; D21H 11/20
(52) U.S. Cl. ................ 8/116.1; 8/181; 162/9
(58) Field of Search ............... 8/181, 116.1; 162/9

(56) References Cited

U.S. PATENT DOCUMENTS

| | | | |
|---|---|---|---|
| 3,575,177 A | 4/1971 | Briskin et al. ............... 132/2 |
| 4,100,341 A | 7/1978 | Brasey et al. ............... 536/56 |
| 4,505,775 A | 3/1985 | Harding et al. ............... 162/9 |
| 5,667,637 A | 9/1997 | Jewell et al. ............... 162/146 |
| 5,755,828 A | 5/1998 | Westland ............... 8/185 |
| 6,379,494 B1 | 4/2002 | Jewell et al. ............... 162/9 |
| 6,409,881 B1 | 6/2002 | Jaschinski ............... 162/9 |

FOREIGN PATENT DOCUMENTS

| | | | |
|---|---|---|---|
| EP | 0574666 | 4/1993 | ......... C07D/211/94 |
| WO | WO 95/07303 | 3/1995 | |
| WO | WO 96/36621 | 11/1996 | ......... C07D/295/22 |
| WO | WO 96/38484 | 12/1996 | .......... C08B/31/18 |
| WO | WO 98/27117 | * 6/1998 | |
| WO | WO 99/23117 | 5/1999 | |
| WO | WO 99/57158 | 11/1999 | .......... C08B/31/18 |
| WO | WO 00/56978 | 9/2000 | .......... D21H/21/10 |

OTHER PUBLICATIONS

Andersson, R., J. Hoffman, N. Nahar, and E. Scholander. An n.m.r. study of the products of oxidation of cellulose and (1→4)–β–D–xylan with sodium nitride in orthophosphoric acid. *Carbohydrate Research* 206: 340–346 (1990).

(List continued on next page.)

*Primary Examiner*—Margaret Einsmann

(57) ABSTRACT

The invention is directed to a method of making carboxylated cellulose fibers whose fiber strength and degree of polymerization is not significantly sacrificed. The method involves the use of cyclic nitroxide free radical compounds as a primary oxidant and a hypohalite salt as a secondary oxidant in an aqueous environment. Preferably the oxidized cellulose is then stabilized against D.P. loss in alkaline environments and color reversion with a reducing agent such as sodium borohydride. Alternatively it may be treated with an oxidant such as sodium chlorite. The method results in a high percentage of carboxyl groups located at the fiber surface. The product is especially useful as a papermaking fiber where it contributes strength and has a higher attraction for cationic additives. The product is also useful as an additive to recycled fiber to increase strength. The method can be used to improve properties of either virgin or recycled fiber. It does not require high α-cellulose fiber but is suitable for regular market pulps.

64 Claims, 6 Drawing Sheets

OTHER PUBLICATIONS

Besemer, A. C., A. E. J. de Nooy. and H. van Bekkum. Methods for selective oxidation of cellulose: Preparation of 2,3–dicarboxycellulose and 6–carboxy–cellulose. In *Cellulose Derivatives*, T. J. Heinze and W. G. Glasser eds., Ch. 5, pp 73–82 (8/1996).

Barzyk, D., D. H. Page, and A. Ragauskas. Acidic group topochemistry and fibre–to–fibre bond strength. *Journal of Pulp and Paper Science* 23(2): J59–J61 (2/1997).

Barzyk, D., D. H. Page, and A. Ragauskas. Carboxylic acid groups and fibre bonding. In *The Fundamentals of Papermaking Materials: Transactions of 11$^{th}$ Fundamental Research Symposium*, Cambridge, 2:893–907 (Sep. 1997).

Chang, P. S. and J. F. Robyt. Oxidation of primary alcohol groups of naturally occurring polysaccharides with 2,2,6,6–tetramethylpiperidine oxoammonium ion. *Journal of Carbohydrate Chemistry* 15(7): 819–830 (1996).

Datye, K. V. and G. M. Nabar. Studies in the reaction of formaldehyde with unmodified, modified, and dyed celluloses. Part III: The reaction of formaldehyde and oxycelluloses. *Textile Research Journal* 33(7): 500–510 (1963).

Davis, N. J. and S. L. Flitsch. Selective oxidation of monosaccharide derivatives to uronic acids. *Tetrahedron Letters* 34(7): 1181–1184 (1993).

Fukatsu, K. Dyeing and mechanical properties of cotton modified for cationic dyes with hydrophobic and acidic groups. *Textile Research Journal* 62(3):135–139 (3/1992).

Kitaoka, T., A Isogai, and F. Onabe. Chemical modification of pulp fibers by TEMPO–mediated oxidation. *Nordic Pulp and Papewr Research Journal* 14(4):279–284 (4/1999).

Isogai, A. and Y. Kato. Preparation of polyuronic acid from cellulose by TEMPO–medicated oxidation. *Cellulose* 5:153–164 (1998).

Luner, P., K. P. Vemuri, and B. Leopold. The effect of chemical modification on the mechanical properties of paper. II. Wet strength of oxidized springwood and summerwood southern pike kraft fibers. *Tappi* 50(3): 1127–120 (1967).

Luner, P., K. P. Vemuri, and F. Womeldorff. The effect of chemical modification on the mechanical properties of paper. III. Dry strength of oxidized springwood and summerwood southern pine kraft fibers. *Tappi* 50(5): 227–230 (1967).

de Nooy, A. E. J., A. C. Besemer, and H. van Bekkum. Highly selective TEMPO mediated oxidation of primary alcohol groups in polyaccharides. *Receuil des Traveau Chimiques des Pays–Bas* 113(3): 165–166 (3/1994).

de Nooy, A. E. J., A. C. Besemer, and H. van Bekkum. Highly selective nitroxyl radical–mediated oxidation of primary alcohol groups in water soluble glucans. *Carbohydrate Research* 269:89–98 (1995).

Shenai, V. A. and A. S. Narkhede. Hypochlorite oxidation of cellulose in the presence of cobalt sulfide. *Textile Dyer and Printer* 20:17–22 (1987).

Shet, R. T. and A. M. Yabani. Crease–recovery and tensile–strength properties of unmodified and modified cotton cellulose treated with crosslinking agents. *Textile Research Journal* 51(11): 740–744 (1981).

Young, R. A. Bonding of oxidized cellulose fibers and interaction with wet strength resins. *Wood and Fiber* 10(2):112–119 (1978).

Anelli, P. L., S. Banfi, F. Montanari, and S. Quichi. Oxidation of diols with alkali hypochlorites catalyzed by oxammonium salts under two–phase conditions. *Journal of Organic Chemistry* 54: 2970–2972 (1/1989).

Isogai, A. Application of stable nitroxyl radical reagents to cellulose modification. *Cellulose Communications* 5(3): 153–164 (1998).

* cited by examiner

METHOD OF MAKING CARBOXYLATED CELLULOSE FIBERS AND PRODUCTS OF THE METHOD

This application is a continuation-in-part of application Ser. No. 09/418,909, filed Oct. 15, 1999, now U.S. Pat. No. 6,374,494 which was in turn a continuation-in-part of application Ser. No. 09/272,137, filed Mar. 19, 1999, now abandoned.

The present invention is directed to a method of making carboxylated cellulose fibers including those in which fiber strength and degree of polymerization is not significantly sacrificed. The invention is further directed to the carboxylated fibers and to products made using the fibers.

BACKGROUND OF THE INVENTION

Cellulose is a carbohydrate consisting of a long chain of glucose units, all β-linked through the 1'-4 positions. Native plant cellulose molecules may have upwards of 2200 anhydroglucose units. The number of units is normally referred to as degree of polymerization or simply D.P. Some loss of D.P. inevitably occurs during purification. A D.P. approaching 2000 is usually found only in purified cotton linters. Wood derived celluloses rarely exceed a D.P. of about 1700. The structure of cellulose can be represented as follows:

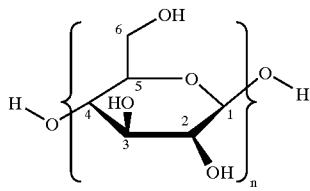

Chemical derivatives of cellulose have been commercially important for almost a century and a half. Nitrocellulose plasticized with camphor was the first synthetic plastic and has been in use since 1868. A number of cellulose ether and ester derivatives are presently commercially available and find wide use in many fields of commerce. Virtually all cellulose derivatives take advantage of the reactivity of the three available hydroxyl groups. Substitution at these groups can vary from very low; e.g. about 0.01 to a maximum 3.0. Among important cellulose derivatives are cellulose acetate, used in fibers and transparent films; nitrocellulose, widely used in lacquers and gun powder; ethyl cellulose, widely used in impact resistant tool handles; methyl cellulose, hydroxyethyl, hydroxypropyl, and sodium carboxymethyl cellulose, water soluble ethers widely used in detergents, as thickeners in foodstuffs, and in papermaking.

Cellulose itself has been modified for various purposes. Cellulose fibers are naturally anionic in nature as are many papermaking additives. A cationic cellulose is described in Harding et al. U.S. Pat. No. 4,505,775. This has greater affinity for anionic papermaking additives such as fillers and pigments and is particularly receptive to acid and anionic dyes. Jewell et al., in U.S. Pat. No. 5,667,637, teach a low degree of substitution (D.S.) carboxyethyl cellulose which, along with a cationic resin, improves the wet to dry tensile and burst ratios when used as a papermaking additive. Westland, in U.S. Pat. No. 5,755,828 describes a method for increasing the strength of articles made from cross linked cellulose fibers having free carboxylic acid groups obtained by covalently coupling a polycarboxylic acid to the fibers.

For some purposes cellulose has been oxidized to make it more anionic; e.g., to improve compatibility with cationic papermaking additives and dyes. Various oxidation treatments have been used. Among these are nitrogen dioxide and periodate oxidation coupled with resin treatment of cotton fabrics for improvement in crease recovery as suggested by R. T. Shet and A. M. Nabani, *Textile Research Journal* November 1981: 740–744. Earlier work by K. V. Datye and G. M. Nabar, *Textile Research Journal*, July 1963: 500–510, describes oxidation by metaperiodates and dichromic acid followed by treatment with chlorous acid for 72 hours or 0.05 M sodium borohydride for 24 hours. Copper number was greatly reduced by borohydride treatment and less so by chlorous acid. Carboxyl content was slightly reduced by borohydride and significantly increased by chlorous acid. The products were subsequently reacted with formaldehyde. P. Luner et al., *Tappi* 50(3): 117–120 (1967) oxidized southern pine kraft springwood and summer wood fibers with potassium dichromate in oxalic acid. Handsheets made with the fibers showed improved wet strength believed due to aldehyde groups. P. Luner et al., in *Tappi* 50(5): 227–230 (1967) expanded this earlier work and further oxidized some of the pulps with chlorite or reduced them with sodium borohydride. Handsheets from the pulps treated with the reducing agent showed improved sheet properties over those not so treated. R. A. Young, *Wood and Fiber*, 10(2): 112–119 (1978) describes oxidation primarily by dichromate in oxalic acid to introduce aldehyde groups in sulfite pulps for wet strength improvement in papers. V. A. Shenai and A. S. Narkhede, *Textile Dyer and Printer* May 20, 1987: 17–22 describe the accelerated reaction of hypochlorite oxidation of cotton yarns in the presence of physically deposited cobalt sulfide. The authors note that partial oxidation has been studied for the past hundred years in conjunction with efforts to prevent degradation during bleaching. They also discuss in some detail the use of 0.1 M sodium borohydride as a reducing agent following oxidation. The treatment was described as a useful method of characterizing the types of reducing groups as well as acidic groups formed during oxidation. The borohydride treatment noticeably reduced copper number of the oxidized cellulose. Copper number gives an estimate of the reducing groups such as aldehydes present on the cellulose. Borohydride treatment also reduced alkali solubility of the oxidized product but this may have been related to an approximate 40% reduction in carboxyl content of the samples. R. Andersson et al. in *Carbohydrate Research* 206: 340–346 (1990) teach oxidation of cellulose with sodium nitrite in orthophosphoric acid and describe nuclear magnetic resonance elucidation of the reaction products.

N. J. Davis and S. L. Flitsch, *Tetrahedron Letters* 34(7): 1181–1184 (1993) describe the use and reaction mechanism of 2,2,6,6-tetramethylpiperidinyloxy free radical (TEMPO) with sodium hypochlorite to achieve selective oxidation of primary hydroxyl groups of monosaccharides. Following the Davis et al. paper this route to carboxylation then began to be more widely explored. A. E. J. de Nooy et al., in a short paper in *Receuil des Travaux Chimiques des Pays-Bas* 113: 165–166 (1994), report similar results using TEMPO and hypobromite for oxidation of primary alcohol groups in potato starch and inulin. The following year, these same authors in *Carbohydrate Research* 269: 89–98 (1995) report highly selective oxidation of primary alcohol groups in water soluble glucans using TEMPO and a hypochlorite/bromide oxidant.

PCT published patent application WO 95/07303 (Besemer et al.) describes a method of oxidizing water soluble carbohydrates having a primary alcohol group, using TEMPO with sodium hypochlorite and sodium bromide.

Cellulose is mentioned in passing in the background although the examples are principally limited to starches. The method is said to selectively oxidize the primary alcohol at C-6 to carboxyl. None of the products studied were fibrous in nature.

PCT application WO 99/23117 (Viikari et al.) teaches oxidation using TEMPO in combination with the enzyme laccase or other enzymes along with air or oxygen as the effective oxidizing agents of cellulose fibers, including kraft pine pulps.

A year following the above noted Besemer publication, the same authors, in *Cellulose Derivatives*, T. J. Heinze and W. G. Glasser, eds., Ch. 5, pp 73–82 (1996), describe methods for selective oxidation of cellulose to 2,3-dicarboxy cellulose and 6-carboxy cellulose using various oxidants. Among the oxidants used were a periodate/chlorite/hydrogen peroxide system, oxidation in phosphoric acid with sodium nitrate/nitrite, and with TEMPO and a hypochlorite/bromide primary oxidant. Results with the TEMPO system were poorly reproduced and equivocal. The statement that ". . . some of the material remains undissolved" was puzzling. In the case of TEMPO oxidation of cellulose, little or none would have been expected to go into solution. The homogeneous solution of cellulose in phosphoric acid used for the sodium nitrate/sodium nitrite oxidation was later treated with sodium borohydride to remove any carbonyl function present.

P.-S. Chang and J. F. Robyt, *Journal of Carbohydrate Chemistry* 15(7): 819–830 (1996),describe oxidation of ten polysaccharides including α-cellulose at 0° C. and 25° C. using TEMPO with sodium hypochlorite and sodium bromide. Ethanol addition was used to quench the oxidation reaction. The resulting oxidized α-cellulose had a water solubility of 9.4%. The authors did not further describe the nature of the α-cellulose. It is presumed to have been a so-called dissolving pulp or cotton linter cellulose. D. Barzyk et al., in *Transactions of the 11$^{th}$ Fundamental Research Symposium*, Vol. 2, 893–907 (1997), note that carboxyl groups on cellulose fibers increase swelling and impact flexibility, bonded area and strength. They designed experiments to increase surface carboxylation of fibers. However, they ruled out oxidation to avoid fiber degradation and chose to form carboxymethyl cellulose in an isopropanol/methanol system.

Isogai, A. and Y. Kato, in *Cellulose* 5: 153–164 (1998) describe treatment of several native, mercerized, and regenerated celluloses with TEMPO to obtain water soluble and insoluble polyglucuronic acids. They note that the water soluble products had almost 100% carboxyl substitution at the C-6 site. They further note that oxidation proceeds heterogeneously at the more accessible regions on solid cellulose.

Kitaoka, T., A., A. Isogai, and F. Onabe, in *Nordic Pulp and Paper Research Journal*, 14(4): 279–284 (1999), describe the treatment of bleached hardwood kraft pulp using TEMPO oxidation. Increasing amounts of carboxyl content gave some improvement in dry tensile index, Young's modulus and brightness, with decreases in elongation at breaking point and opacity. Other strength properties were unaffected. Retention of PAE-type wet strength resins was somewhat increased. The products described did not have any stabilization treatment after the TEMPO oxidation.

None of the previous workers have described a stable fibrous carboxylated cellulose that can be made in conventional papermill equipment in an aqueous system with minimum D.P. loss to yield a product with superior papermaking properties.

SUMMARY OF THE INVENTION

The present invention is directed to a fibrous carboxylated cellulose product, to the method of its manufacture, and to sheeted paper products using the carboxylated fibers. A chemically purified fibrous cellulose market pulp is the basic material for the process. This may be, but is not limited to, bleached or unbleached sulfite, kraft, or prehydrolyzed kraft hardwood or softwood pulps or mixtures of hardwood and softwood pulps. So-called high alpha cellulose or chemical pulps are not considered as raw materials included within the scope of the invention.

The suitability of lower cost market pulps is a significant advantage of the process. Market pulps are used for many products such as fine papers, diaper fluff, paper towels and tissues, etc. These pulps generally have about 86–88% α-cellulose and 12–14% hemicellulose whereas the high α-cellulose chemical or dissolving pulps have about 92–98% α-cellulose. To the present inventors' knowledge the lower α-cellulose pulps or other cellulose having a high content of hemicellulose have never before been treated with TEMPO or other cyclic nitroxide compounds to produce a stable carboxylated fiber. By stable is meant minimum D.P. loss in alkaline environments, and very low self cross linking and color reversion. The method of the invention is particularly advantageous for treating secondary (or recycled) fibers. Bond strength of the sheeted carboxylated fibers is significantly improved over untreated recycled fiber.

The term "cellulose" when used hereafter and in the claims refers to a wood based cellulose market pulp below 90% α-cellulose, generally having about 86–88% α-cellulose and a hemicellulose content of about 12%.

The process of the invention will lead to a product having an increase in carboxyl substitution over the starting material of at least about 2 meq/100 g, preferably about 5 meq/100 g. Carboxylation occurs predominantly at the hydroxyl group on C-6 of the sugar units to yield uronic acids.

The literature has reported the use of TEMPO as an oxidant of primary hydroxyl group on various carbohydrate materials. However, there is little or no use of other nitroxide materials reported and the presumption has been that these were not effective oxidants. Surprisingly, the present inventors have found that a wide number of species of cyclic nitroxides are equally as effective as TEMPO and that many of them offer advantages in convenience of use, cost, or performance.

The cellulose fiber in an aqueous slurry or suspension is first oxidized by addition of a primary oxidizer comprising a cyclic nitroxide lacking any hydrogen substitution on either of the carbon atoms adjacent the nitroxide nitrogen. Nitroxides having both five and six membered rings have been found to be satisfactory. Both five and six membered rings may have either a methylene group or another heterocyclic atom selected from nitrogen, sulfur or oxygen at the four position in the ring, and both rings may have substituent groups at this location. It is important that the nitroxide chosen be stable in an aqueous alkaline environment in the range of about pH 8–11.

A large group of nitroxide compounds have been found to be suitable. 2,2,6,6-Tetramethylpiperidinyl-1-oxy free radical (TEMPO) is among the exemplary nitroxides found useful. Another suitable product linked in a mirror image relationship to TEMPO is 2,2,2'2',6,6,6',6'-octamethyl-4,4'-bipiperidinyl-1,1'-dioxy di-free radical (BI-TEMPO). Similarly, 2,2,6,6-tetramethyl-4-hydroxypiperidinyl-1-oxy free radical; 2,2,6,6-tetramethyl-4-methoxypiperidinyl-1- oxy free radical; and 2,2,6,6-tetramethyl-4-benzyloxypiperidinyl-1-oxy free radical; 2,2,6,6-tetramethyl-4-aminopiperidinyl-1-oxy free radical; 2,2,6,6-tetramethyl-4-acetylaminopiperidinyl-1-oxy free radical; and 2,2,6,6-tetramethyl-4-piperidone-1-oxy free radical are examples of compounds with substitution at the 4 position of TEMPO that have been found to be very satisfactory oxidants. Among the nitroxides with a second hetero atom in the ring at the four position (relative to the nitrogen atom), 3,3,5,5-tetramethylmorpholine-1-oxy free radical (TEMMO) is very useful.

The nitroxides are not limited to those with saturated rings. One compound found to be a very effective oxidant is 3,4-dehydro-2,2,6,6-tetramethyl-piperidinyl-1-oxy free radical.

Six membered ring compounds with double substitution at the four position have been especially useful because of their relative ease of synthesis and lower cost. Exemplary among these are the ethylene, propylene, and neopentyl cyclic acetals of 2,2,6,6- tetramethyl-4-piperidone-1-oxy free radical.

Among the five membered ring products, 2,2,5,5-tetramethyl-pyrrolidinyl-1-oxy free radical has been found to be very effective.

The above named compounds should only be considered as exemplary among the many representatives of the nitroxides suitable for use with the invention and those named are not intended to be limiting in any way.

It is also considered to be within the scope of the invention to form the nitroxides in situ by oxidation of the hydroxylamines of any of the nitroxide free radical products. Oxammonium salts of the nitroxides are also suitable. While the nitroxide is consumed and converted to an oxammonium salt then to a hydroxylamine during the oxidation reaction, it is continuously regenerated by the presence of a secondary oxidant. A water soluble hypohalite compound is a preferred secondary oxidant. Since the nitroxide is not irreversibly consumed in the oxidation reaction only a small amount of it is required. During the course of the reaction it is the secondary oxidant which will be depleted. The amount of nitroxide required is in the range of about 0.005% to 1.0% based on cellulose present, preferably about 0.02–0.25%. The nitroxide is known to preferentially oxidize the primary hydroxyl located on C-6 of the anhydroglucose moiety of cellulose. It can be assumed that a similar oxidation will occur at primary alcohol groups on hemicellulose.

The nitroxide may first be premixed with a portion of an aqueous hypohalite to form a homogeneous solution before addition to the cellulose fiber slurry. Ultrasonic agitation may be useful to increase dissolution rate. The oxidation reaction may be allowed to continue over a time period from about one minute to ten or more hours at temperatures from about 0–75° C., preferably about 0°–30° C. Following the oxidation reaction, if maximum D.P. stability is desired, the cellulose is washed and reslurried in water where it is subjected to the action of a stabilizing reagent to convert substituent groups, such as aldehydes and ketones, to hydroxyl or carboxyl groups. Unstabilized nitroxide oxidized pulps have objectionable color reversion and will self crosslink upon drying, thereby reducing their ability to redisperse and to form strong bonds when used in sheeted products.

A preferred hypohalite is sodium hypochlorite (NaOCl). Sodium hypochlorite is inexpensive and readily available as a stable aqueous solution with about 4–10% NaOCl w/v. This can be made in situ by bubbling chlorine gas into a solution of NaOH. Admixture of NaOCl with sodium bromide (NaBr) will accelerate the oxidation reaction and the use of this combination is highly preferred. About 3 parts by weight NaBr to 4 parts of NaOCl has proved very satisfactory, although this ratio is not critical. The usage of NaOCl may be in the range of about 0.8–6.5 g/L of pulp slurry, preferably about 1.1–1.4 g/L. Usage of NaOCl based on cellulose will be within the range of about 0.5–35% by weight, preferably about 1.3–10.5% by weight. Exact usage will depend on the amount of carboxylation desired. The pH during oxidation should generally be maintained within the range of 8–11, preferably 9–10 and most preferably 9.5–9.8. The oxidation reaction will proceed at higher and lower pH values but at lower efficiencies.

A proprietary composition sold as Stabrex™, available from Nalco Chemical Co., Chicago, Ill., may be used in place of the hypochlorite oxidant. Stabrex is sold as an aqueous stabilized highly alkaline solution of a bromine-containing composition having 1–5% NaOH, a minimum pH of 13, and is a latent source of hypobromite. The composition contains a stabilizer which is believed to be a sulfonated nitrogen containing compound. The Stabrex is useful where environmental or other considerations might dictate against the use of chlorine based materials.

It will be understood that in accordance with usual reaction kinetics the oxidation will proceed at a higher rate with increased concentrations of oxidants and at higher temperatures. Reaction at lower temperatures; e.g., at 0°–10° C., is preferred from the standpoint of reducing cellulose D.P. degradation. However, the reaction may also be carried out at higher temperatures to produce products having a D.P. higher than 600.

Following oxidation, the cellulose is washed to remove any residual chemicals and may then be dried or further processed. If maximum stability and D.P. retention is desired the oxidized product is reslurried in water for treatment with a stabilizing agent. The stabilizing agent may either be a reducing agent or another oxidizing agent. A preferred reducing agent is preferably an alkali metal borohydride. Sodium borohydride ($NaBH_4$) is preferred from the standpoint of cost and availability. However, other borohydrides such as $LiBH_4$, or alkali metal cyanoborohydrides such as $NaBH_3CN$ are also suitable. $NaBH_4$ may be mixed with LiCl to form a very useful reducing agent. When $NaBH_4$ is used for reduction, it should be present in an amount between about 0.1 and 100 g/L. A more preferred amount would be about 0.25–5 g/L and a most preferred amount from about 0.5–2.0 g/L. Based on cellulose the amount of reducing agent should be in the range of about 0.1% to 4% by weight, preferably about 1–3%. Reduction may be carried out at room or higher temperature for a time between 10 minutes and 10 hours, preferably about 30 minutes to 2 hours.

Alkali metal chlorites are preferred oxidizing agents used as stabilizers, sodium chlorite being preferred because of the cost factor. Other compounds that may serve equally well as oxidizers are permanganates, chromic acid, bromine, and silver oxide. A combination of chlorine dioxide and hydrogen peroxide is also a suitable oxidizer when used at the pH range designated for sodium chlorite. Oxidation using sodium chlorite may be carried out at a pH in the range of about 1.5–5, preferably 2–4, at temperatures between about 25°–90° C. for times from about 5 minutes to 50 hours, preferably about 10 minutes to 2 hours. One factor that favors oxidants as opposed to reducing agents is that aldehyde groups on the oxidized cellulose are converted to additional carboxyl groups, thus resulting in a more highly carboxylated product. These stabilizing oxidizers are referred to as "tertiary oxidizers" to distinguish them from the nitroxide/hypochlorite primary/secondary oxidizers. The tertiary oxidizer is used in a molar ratio of about 1.0–15 times the presumed aldehyde content of the oxidized cellulose, preferably about 5–10 times. In a more convenient way of measuring the required tertiary oxidizer needed, the preferred sodium chlorite usage should fall within about 0.001 g sodium chlorite/g of fiber to 0.2 g/g, preferably 0.01–0.09 g/g, the chlorite being calculated on a 100% active material basis.

After stabilization is completed, the cellulose is again washed and may be dried if desired. Alternatively, the carboxyl substituents may be converted to other cationic forms beside hydrogen or sodium; e.g., calcium, magnesium, or ammonium.

One particular advantage of the process is that all reactions are carried out in an aqueous medium to yield a product in which the carboxylation is primarily located on the fiber surface. This conveys highly advantageous properties for paper-making. The product of the invention will have at least about 20% of the total carboxyl content on the fiber surface. This is in comparison with about 10% as is the case with untreated fiber.

The carboxylated fiber of the invention is highly advantageous as a papermaking furnish, either by itself or in conjunction with conventional fiber. It may be used in amounts from 0.5–100% of the papermaking furnish. The carboxylated fiber is especially useful in admixture with recycled fiber to add strength. Its increased number of anionic sites should serve to ionically hold significantly larger amounts of cationic papermaking additives than untreated fiber. These additives may be wet strength resins, sizing chemical emulsions, filler and pigment retention aids, charged filler particles, dyes and the like. Carboxylated pulps do not hornify (or irreversibly collapse) as much on drying and are a superior material when recycled. They swell more on rewetting, take less energy to refine, and give higher sheet strength.

It is thus an object of the invention to provide a method of making a cellulose fiber having enhanced carboxyl content using an aqueous reaction medium.

It is also an object to provide a cellulose papermaking fiber having enhanced carboxyl content.

It is a further object to provide a cellulose fiber having an enhanced carboxyl content at the fiber surface.

It is another object to provide a carboxylated cellulose fiber that is stable against D.P. loss in alkaline environments.

It is yet an object to provide a stable cellulose fiber of enhanced carboxyl content with a D.P. of at least 850 measured as a sodium salt or 700 when measured in the free acid form.

It is still an object to provide a cellulose fiber having a high ionic attracion to cationic papermaking additives.

It is an additional object to provide cellulose pulp and paper products containing the carboxyl enhanced fiber.

These and many other objects will become readily apparent upon reading the following detailed description taken in conjunction with the drawings

DETAILED DESCRIPTION OF THE PREFERRED EMBODIMENTS

Figure 1:
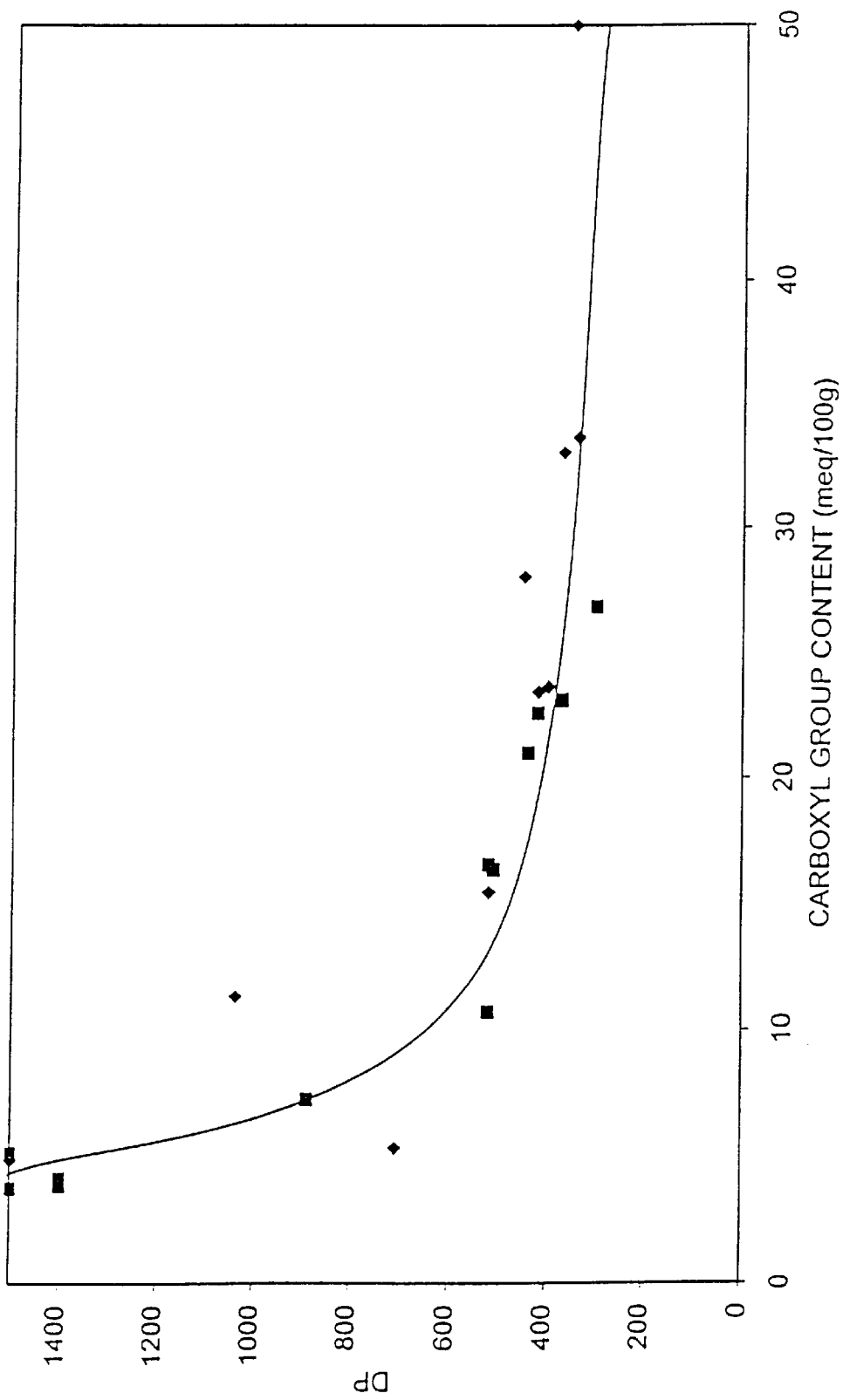
FIG. 1 is a graph plotting D.P. against carboxyl content for unreduced oxidized wood pulp.

It is believed that a nitroxide catalyzed cellulose oxidation predominantly occurs at the primary hydroxyl group on C-6 of the anhydroglucose moeity. In contrast to some of the other routes to oxidized cellulose, only very minor reaction is believed to occur at the secondary hydroxyl groups at the C-2 and C-3 locations. Using TEMPO as an example, the mechanism to formation of a carboxyl group at the C-6 location proceeds through an intermediate aldehyde stage as follows:

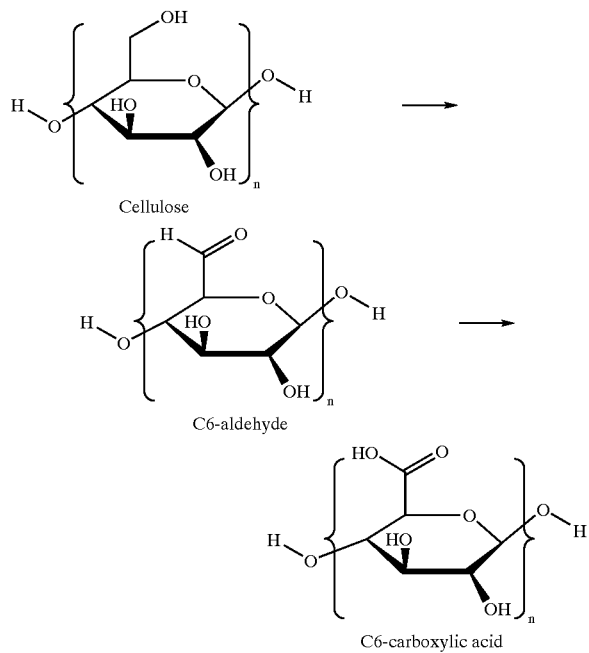

The TEMPO is not irreversibly consumed in the reaction but is continuously regenerated. It is converted by the hypohalite into the nitrosonium (or oxyammoium) ion which is the actual oxidant. During oxidation the nitrosonium ion is reduced to the hydroxylamine from which TEMPO is again formed. Thus, it is the hypohalite salt which is actually consumed. TEMPO may be reclaimed or recycled from the aqueous system. The reaction is postulated to be as follows:

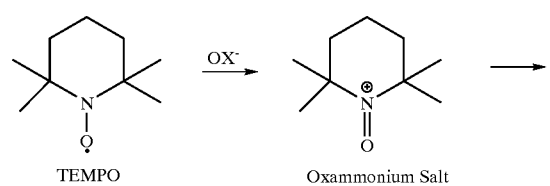

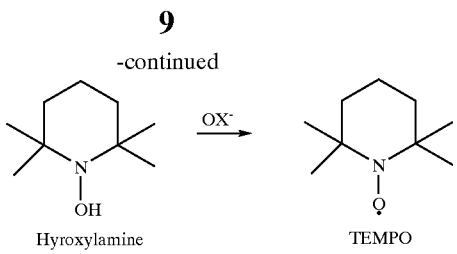

Hyroxylamine → TEMPO

As was noted earlier, formation of TEMPO in situ by oxidation of the hydroxylamine or the amine is considered to be within the scope of the invention.

The resulting oxidized cellulose product will have an equilibrium mixture of carboxyl and aldehyde substitution. Aldehyde substituents on cellulose are known to cause degeneration over time and under certain environmental conditions. In addition, minor quantities of ketone carbonyls may be formed at the C-2 and C-3 positions of the anhydroglucose units and these will also lead to degradation. Marked D.P., fiber strength loss, crosslinking, and yellowing are among the problems encountered. For these reasons, we have found it very desirable to reduce aldehyde and ketone substituents to hydroxyl groups to ensure stability of the product.

The following groups of nitroxy compounds are known to be effective primary oxidants:

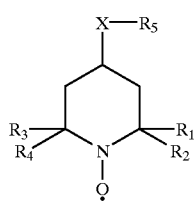

I in which $R_1$–$R_4$ are one to four carbon alkyl groups but $R_1$ with $R_2$ and $R_3$ with $R_4$ may together be included in a five or six carbon alicyclic ring structure; X is sulfur or oxygen; and $R_5$ is hydrogen, $C_1$–$C_{12}$ alkyl, benzyl, 2-dioxanyl, a dialkyl ether, an alkyl polyether, or a hydroxyalkyl, and X with $R_5$ being absent may be hydrogen or a mirror image moiety to form a bipiperidinyl nitroxide. Specific compounds in this group known to be very effective are 2,2,6,6-tetramethylpiperidinyl-1-oxy free radical (TEMPO); 2,2,2',2',6,6,6',6'-octamethyl-4,4'-bipiperidinyl-1,1'-dioxy di-free radical (BI-TEMPO); 2,2,6,6-tetramethyl-4-hydroxypiperidinyl-1-oxy free radical (4-hydroxy-TEMPO); 2,2,6,6-tetramethyl-4-methoxypiperidinyl-1-oxy free radical (4-methoxy-TEMPO); and 2,2,6,6-tetramethyl-4-benzyloxypiperidinyl-1-oxy free radical (4-benzyloxyTEMPO).

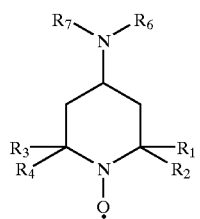

II in which $R_1$–$R_4$ are one to four carbon alkyl groups but $R_1$ with $R_2$ and $R_3$ with $R_4$ may together be included in a five or six carbon alicyclic ring structure; $R_6$ is hydrogen or $C_1$–$C_5$ alkyl; $R_7$ is hydrogen, $C_1$–$C_8$ alkyl, phenyl, carbamoyl, alkyl carbamoyl, phenyl carbamoyl, or $C_1$–$C_8$ acyl. Exemplary of this group is 2,2,6,6-tetramethyl-4-aminopiperidinyl-1-oxy free radical (4-aminoTEMPO); and 2,2,6,6-tetramethyl-4-acetylaminopiperidinyl-1-oxy free radical (4-acetylamino-TEMPO).

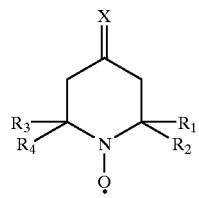

III in which $R_1$–$R_4$ are one to four carbon alkyl groups but $R_1$ with $R_2$ and $R_3$ with $R_4$ may together be included in a five or six carbon alicyclic ring structure; and X is oxygen, sulfur, NH, N-alkyl, NOH, or $NOR_8$ where $R_8$ is lower alkyl. An example might be 2,2,6,6-tetramethyl-4-oxopiperidinyl-1-oxy free radical (2,2,6,6-tetramethyl-4-piperidone).

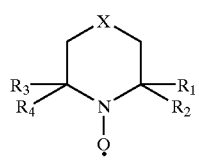

IV wherein $R_1$–$R_4$ are one to four carbon alkyl groups but $R_1$ with $R_2$ and $R_3$ with $R_4$ may be linked into a five or six carbon alicyclic ring structure; X is oxygen, sulfur, -alkyl amino, or acyl amino. An example is 3,3,5,5-tetramethylmorpholine-1-oxy free radical. In this case the oxygen atom takes precedence for numbering but the dimethyl substituted carbons remain adjacent the nitroxide moiety.

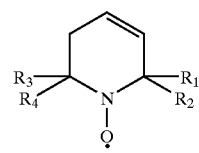

V wherein $R_1$–$R_4$ are one to four carbon alkyl groups but $R_1$ with $R_2$ and $R_3$ with $R_4$ may be linked into a five or six carbon alicyclic ring structure. An example of a suitable compound is 3,4-dehydro-2,2,6,6,-tetramethylpiperidinyl-1-oxy free radical.

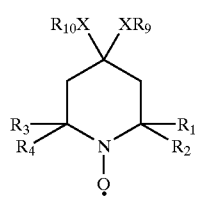

VI wherein $R_1$–$R_4$ are one to four carbon alkyl groups but $R_1$ with $R_2$ and $R_3$ with $R_4$ may together be included in a five or six carbon alicyclic ring structure; X is methylene, oxygen, sulfur, or alkylamino; and $R_9$ and $R_{10}$ are one to five carbon alkyl groups and may together be included in a five or six member ring structure, which may have a one to four alkyl substitutients. Examples include the ethylene, propylene, and neopentyl cyclic acetals of 2,2,6,6-tetramethyl-4-piperidone-1-oxy free radical. These compounds are especially preferred primary oxidants because of their effectiveness, lower cost, ease of synthesis, and suitable water solubility.

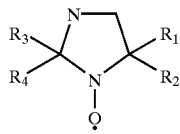

VII in which $R_1$–$R_4$ are one to four carbon alkyl groups but $R_1$ with $R_2$ and $R_3$ with $R_4$ may together be included in a five or six carbon alicyclic ring structure; and X may be methylene, sulfur, oxygen, —NH, or $NR_{11}$, in which $R_{11}$ is a lower alkyl. An example of these five member ring compounds is 2,2,5,5-tetramethylpyrrolidinyl-1-oxy free radical.

Where the term "lower alkyl" is used it should be understood to mean an aliphatic straight or branched chain alkyl moiety having from one to four carbon atoms.

EXAMPLE 1

Oxidation of Cellulose with TEMPO and its Effect on D.P.

A general laboratory method for preparation of a TEMPO catalyzed oxidized cellulose is given as follows. A buffered solution at pH 9.7 was made by adding 5.05 g $NaHCO_3$ and 4.24 $Na_2CO_3$ to 1.3 L of deionized water. To this was added 50 g, dry weight, of a bleached northern softwood kraft market pulp from an Alberta mill. Furnish for this pulp is believed to be a mixture of spruce with some pine and balsam fir. The pulp was dispersed with a mixer to form a slurry in the buffer. After dispersion, 700 g of ice was added to the pulp slurry. An oxidizing solution was made up by mixing 100 mg of TEMPO, 1.0 g of NaBr, and about 2 mL of a 5.25% solution of NaOCl. Ultrasonic agitation is helpful in getting the TEMPO into solution. Mixing was continued until the resulting oily material was dissolved. This was then added to the pulp slurry with mild agitation. An additional 48 mL of the NaOCl solution was dripped into the slurry over the next 7 minutes. Reaction was continued for an additional 18 minutes and the treated pulp was filtered and washed several times with deionized water.

A number of variations were made in the above generalized method including adjusting concentrations of the reactants and reaction time and temperature in order to produce products having a range of carboxyl content. The test method used for determination of carboxyl content was TAPPI T 237. Briefly, the pulp is extracted with dilute HCl, washed, and reacted with a $NaHCO_3$—NaCl solution. The supernatant liquid is titrated with 0.01N HCl to the methyl red endpoint. This test is believed to give a measure of the total carboxyl content of the fiber sample. Degree of polymerization (D.P.) was calculated from viscosity in cupriethylenediamine (cuene) solution determined by TAPPI Method T-230 The relative viscosity determined by the TAPPI method was converted to intrinsic viscosity by ASTM Method D-1795. This result was converted to D.P. by the equation D.P.=(Intrinsic Viscosity×95)/Oven Dry fiber weight.

A generalized curve comparing D.P. with carboxyl content is shown in FIG. 1. Reading from the curve it would appear that even a very low amount of carboxyl substitution by TEMPO catalyzed oxidation results in a significant D.P. reduction.

EXAMPLE 2

Effect of Reducing Agent in Preserving D.P. in TEMPO Oxidized Cellulose

Figure 2:
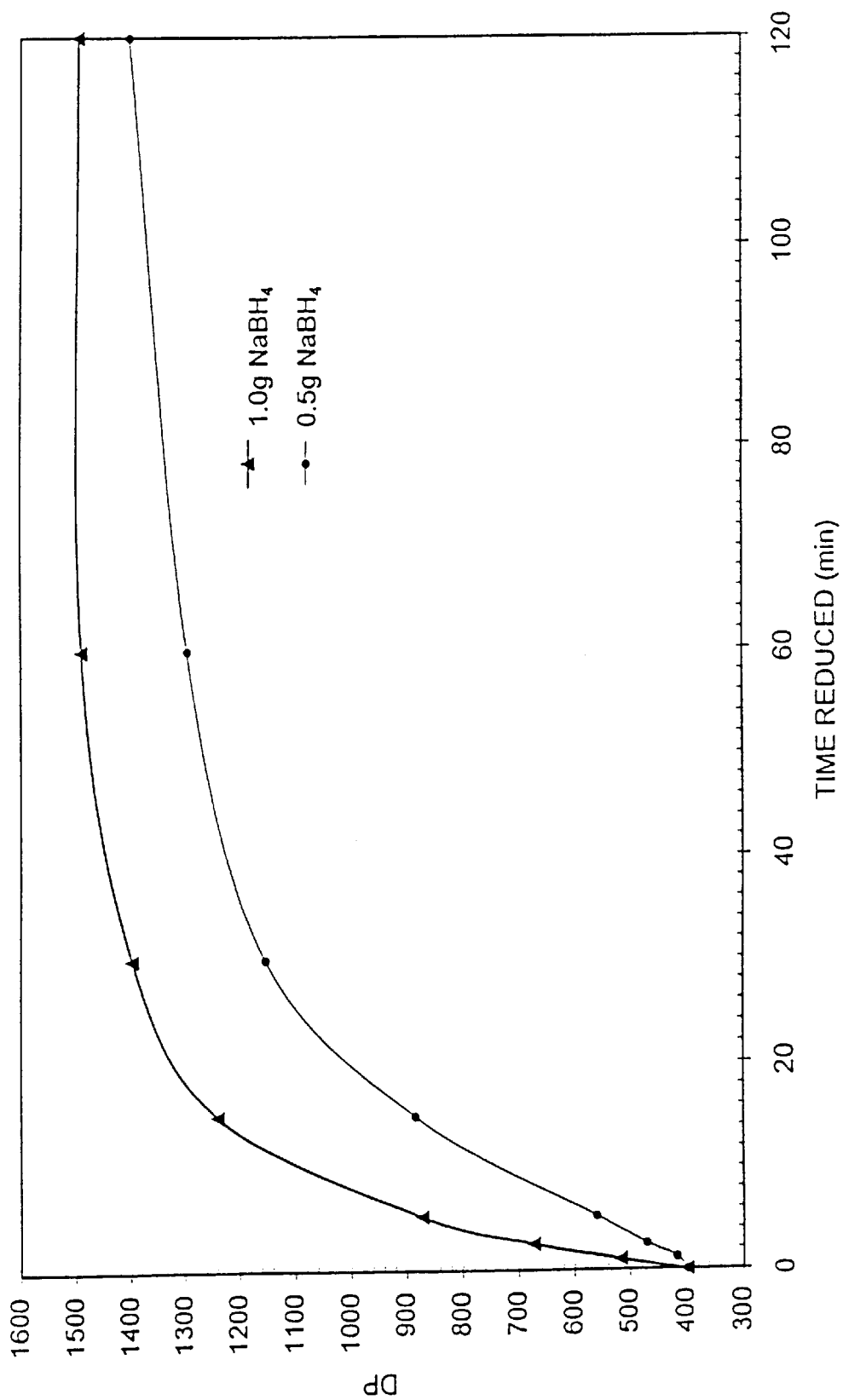
FIG. 2 is a graph showing the effect of reduction time on D.P. for two concentrations of the reducing agent.

A sample of oxidized cellulose was made exactly according to the generalized procedure described in Example 1. The resulting oxidized product was divided without drying into two equal parts. One portion of the oxidized pulp comprising 25 g fiber and 81 g water was suspended in 1 L of water containing 0.5 g $NaBH_4$. The second portion was similarly slurried in 1 L water containing 1.0 g $NaBH_4$. Both samples were at room temperature. Approximately 2 g portions of fiber were removed 1, 2.5, 5.3, 15, 30, 60, and 120 minutes after beginning of the reducing treatment. The samples were washed, and then dried at 105° C. The dried samples were then dissolved in cuene for D.P. determination. Results plotting time in the $NaBH_4$ reducing environment against measured D.P. are shown in the graph on FIG. 2. The D.P. of the original untreated wood pulp was about 1700. It is apparent, and not surprising, that the higher concentration of $NaBH_4$ gives D.P protection at a faster rate. However, at two hours treatment time the ultimate D.P. difference was only about 100 between the higher and lower usages of the reducing agent.

It is evident that unstable substituent groups left on the cellulose with short reduction times are causing D.P. loss in the alkaline cuene solvent used for D.P. measurement. The measurement method appears to be producing a false reading of the actual D.P. of the sample before dissolution in cuene. Logic dictates that a cellulose with a D.P. of about 400 after 2 minutes reduction time could not increase in D.P. to about 1400 after 2 hours reduction time. Even though some of the lower D.P. values are an artifact of the measurement method, the results do give an excellent indication of the expected future stability of the carboxylated product.

EXAMPLE 3

Effect of $NaBH_4$ Concentration

A sample of oxidized cellulose was made precisely according to the generalized procedure described in Example 1. Two gram samples of the oxidized pulp were combined with varying amounts of $NaBH_4$ and made up with water to 80 grams total weight. Borohydride concentrations used were from 0.0078 g to 8.67 g, a range of over a thousand times difference. The borohydride treatment was 2 hours for each of the samples. D.P. measurements on the samples are shown in Table 1.

TABLE 1

Effect of Na $BH_4$ Concentration on D.P. Loss

| $NaBH_4$, g/L | $NaBH_4$, M/L | D.P. | D.P. Loss, % |
|---|---|---|---|
| 0.1 | 0.00264 | 700 | 59 |
| 0.5 | 0.0132 | 1350 | 21 |
| 1.0 | 0.0264 | 1460 | 14 |
| 5 | 0.132 | 1485 | 12 |

TABLE 1-continued

Effect of Na BH$_4$ Concentration on D.P. Loss

| NaBH$_4$, g/L | NaBH$_4$, M/L | D.P. | D.P. Loss, % |
|---|---|---|---|
| 10 | 0.2264 | 1535 | 9.8 |
| 52.7 | 1.39 | 1550 | 9.1 |
| 111.2 | 2.94 | 1545 | 9.3 |
| Control* | — | 1700 | 0 |

*Original unoxidized pulp sample

It is apparent that under the conditions of this test there is little advantage gained in using more than about 0.04 moles/liter or (0.5 g/L) of NaBH$_4$ for D.P. protection. The massive amounts used for some of the later samples offered no advantage.

EXAMPLE 4

Effect of Oxidation Time and Temperature on D.P. and Carboxyl Content

Figure 3:
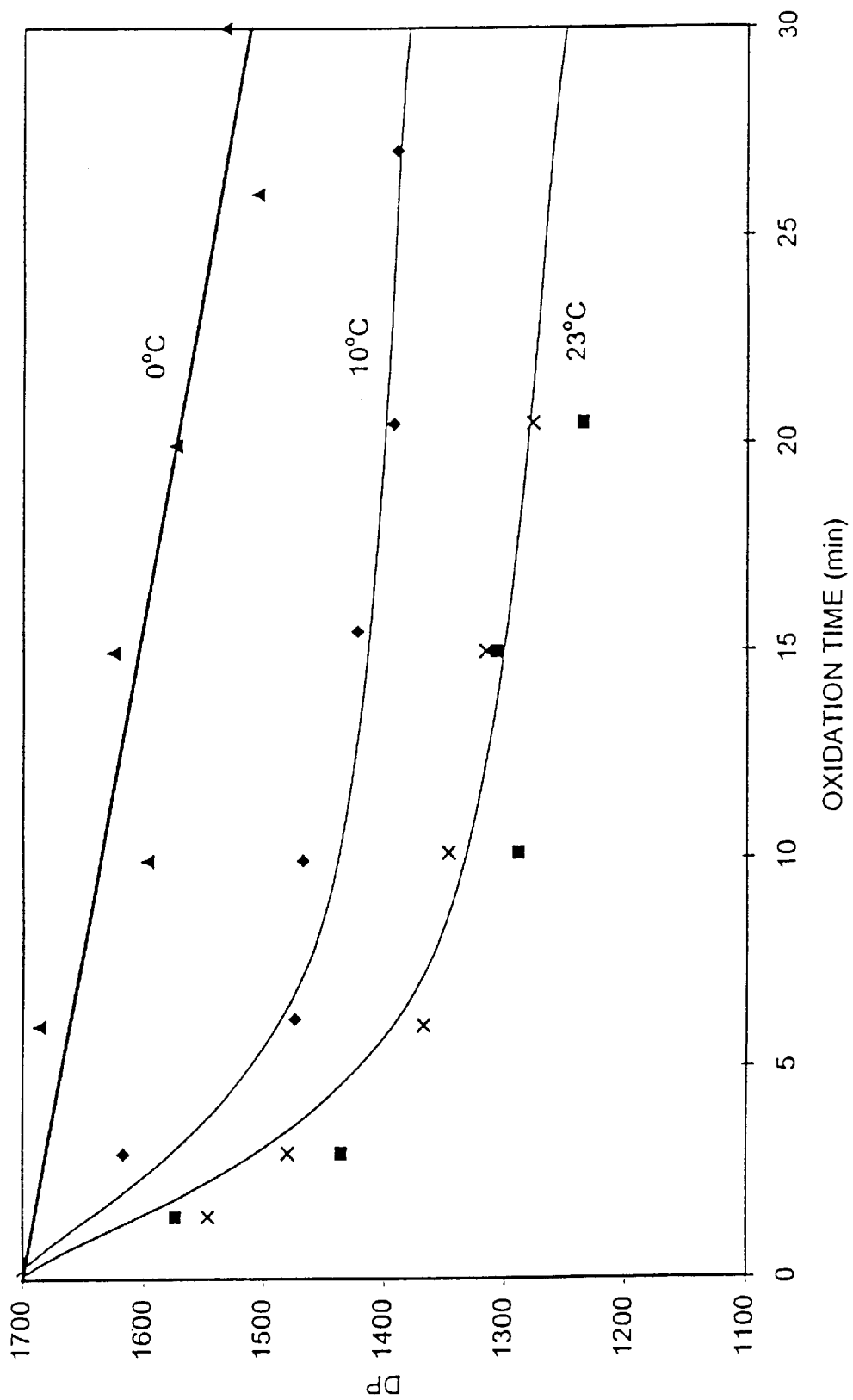
FIG. 3 is a graph showing cellulose D.P. plotted against oxidation time at three reaction temperatures.
Figure 4:
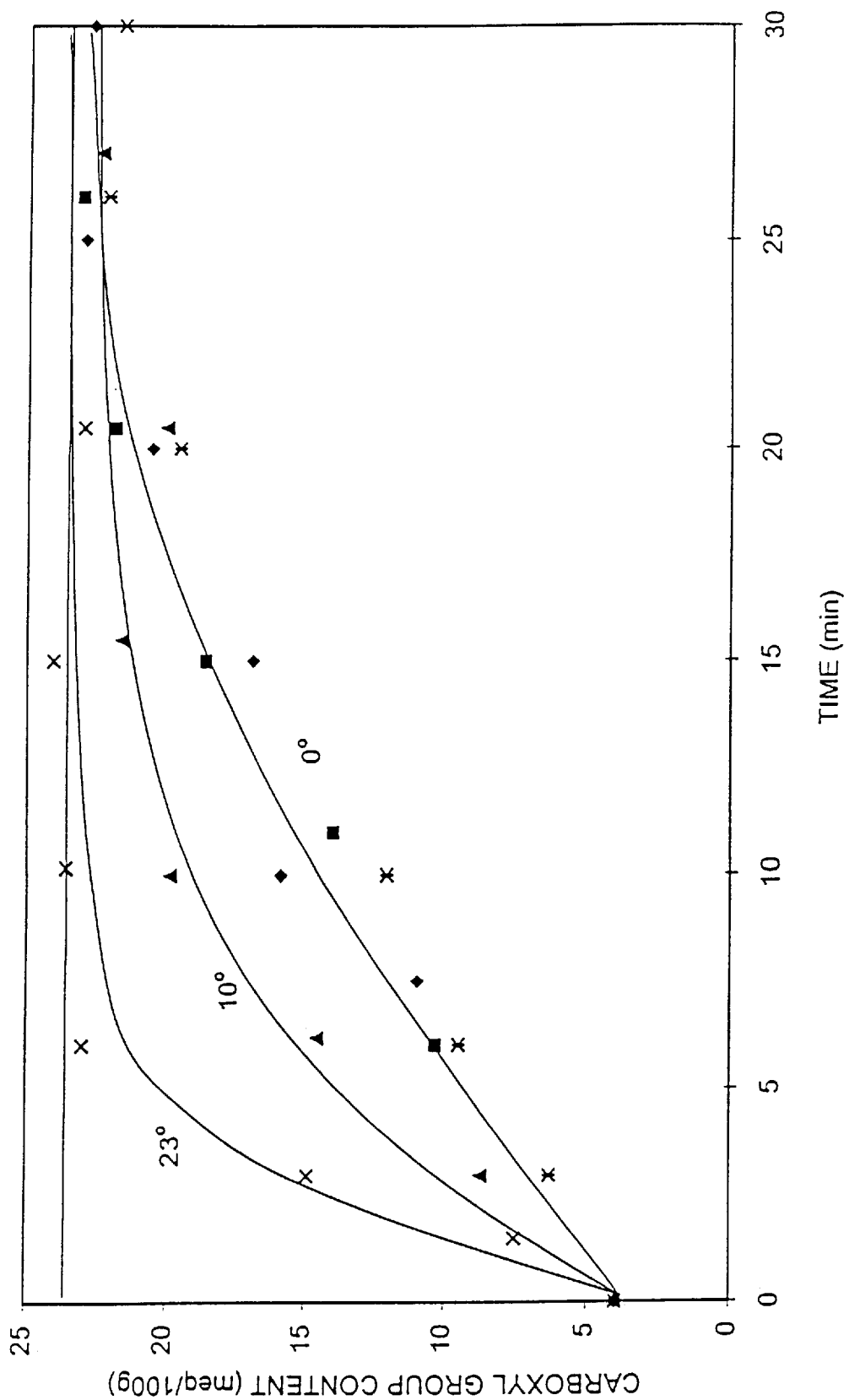
FIG. 4 is a graph showing cellulose carboxyl content plotted against oxidation time at three reaction temperatures.

Three samples were oxidized using a TEMPO catalyst similar to those described in the previous examples. However, in addition to the sample regularly prepared at 0° C., samples were also prepared at 10° and 22° C. During the reaction time 2 g samples were removed at about 3, 6, 10, 15, 20, and 26 minutes after the addition of the TEMPO/hypochlorite mixture. Because of the rapid reaction time at 22° C. a 26 minute sample was not taken. These were immediately washed in deionized water, drained and placed in a 1% NABH$_4$ solution for 2 hours. After drying, D.P. and carboxyl content were determined on the samples. The results of D.P. vs oxidation time are shown in FIG. 3. While D.P. loss was not severe in any of the samples under the conditions used, it is readily apparent that oxidation at lower temperatures is desirable for maximum retention of D.P. FIG. 4 shows a plot of carboxyl content vs reaction time. Again, not surprisingly, carboxyl content increases more rapidly at the higher reaction temperatures. All three samples asymptotically approach a maximum level of about 24 meq/100 g carboxyl, estimated to be reached at about 30 minutes reaction time.

EXAMPLE 5

Preparation of Highly Carboxylated Fibers

In the examples shown to the present time, maximum carboxyl content of the product has been about 25 meq/100 g. It is possible to prepare a fibrous product having much higher substitution; e.g., up to 150 meq/100 g. This may be done most readily by increasing the amount of hypohalite used and/or by extending the reaction time. To illustrate this, three samples were prepared according to the following procedures. For example 5A a buffer solution was prepared using 10.1 g NaHCO$_3$ and 8.48 g Na$_2$CO$_3$ dissolved in 2.6 L of deionized water. In this was dispersed 100 g dry basis of northern softwood kraft pulp followed by the addition of 1.4 kg ice. The pH was about 9.7. An oxidizing mixture was prepared by first mixing 200 mg TEMPO with 2.00 g NaBr then adding ~5 mL of a total 40 mL 5.25% NaOCl solution and mixing well until the oily material was dissolved. This was added to the buffered pulp slurry. The remaining 35 mL of NaOCl solution was added slowly over the next 22 minutes. The slurry was then drained, washed, and redispersed in water with 2.13 g NaBH$_4$ to make a total weight of 1336 g. After 2 hours the pulp from the reducing treatment was again drained and washed. Total carboxyl content was measured as 11 meq/100 g.

For Example 5B, 190 mL of 5.25% NaOCl solution was used and the oxidation time was 2.8 hours. During oxidation the pH dropped from 9.7 to 9.3. After washing the pulp was again slurried in water with 3.2 g NaBH$_4$ to make a total slurry weight of 2000 g. After 1 hour the pulp was drained and washed. Total carboxyl content was measured as 49 meq/100 g.

For Example 5C the oxidizing mixture was made up of 427 mg TEMPO, 2.1 g NaBr and a total of 390 mL 5.25% NaOCl solution. At 2.8 hours after initiation of oxidation pH had dropped to 9.5 and 3 g Na$_2$CO$_3$ was added. After 5 hours the temperature had risen to 8° C. and pH had dropped to 9.0. At that time 250 g of ice and 4 g Na$_2$CO$_3$ were added. Again, at 7.5 hours after the start of oxidation an additional 4 g of Na$_2$CO$_3$ was added. At 8.5 hours the slurry was drained and washed. The oxidized pulp was treated with NaBH$_4$ as in Example 5B. Total carboxyl content was 97 meq/100 g.

Water retention values are an important property of cellulose paper-making fibers. This property may be used to indicate swelling behavior, fiber flexibility, and fiber conformability during drying of a sheeted product. Higher values often indicate higher surface areas or relatively higher fiber saturation points. In general, higher water retention values will correlate with increased strength properties of sheeted products. Water retention as reported herein has been determined by TAPPI Method UM 256. Briefly, a sample of known dry weight is slurried in water, centrifuged, and reweighed. Water retention values, carboxyl content, and D.P. for the three products of the present example are reported in Table 2 following.

TABLE 2

| Sample No. | Carboxyl, meq/100 g | D.P. | Water Retention Value, g/g |
|---|---|---|---|
| 5A | 11 | 1620 | 1.80 |
| 5B | 49 | 1140 | 2.55 |
| 5C | 97 | 860 | 4.21 |
| Untreated | 4 | 1700 | 1.35 |

The improvement in water retention values in all samples in immediately evident.

EXAMPLE 6

Determination of Fiber Surface vs Total Carboxyl

Total carboxyl content of the samples described to this point was, as noted, determined by TAPPI TM 237. Papermaking properties depend heavily on the surface characteristics and ionicity of fibers. It was therefore of interest to determine the distribution of carboxyl groups on and within the fibers. A high surface concentration would be presumed to be beneficial to papermaking properties; e.g. higher retention of cationic additives such as retention aids. The following test method is believed to be specific to readily accessible surface carboxyl groups. It is based on the method described in two papers by L. Wågborg et al., *Nordic Pulp and Paper Journal* no. 2, 71–76 and 135–140. PolyDADMAC, (polydiallyldimethylammonium chloride) was obtained from Polymer Standards Service, Mainz, Germany. This polymer is a high charge density cationic compound and the material used has $M_w$=330,000, $M_N$=220,000 and charge L133. A 0.001 M stock solution was prepared. Into five beakers was placed respectively 3.7 mL, 9.2 mL, 18.4 mL, 27.6 mL and 36.8 mL of the polyDADMAC stock solution. Water was added to each to make the total volume slightly less than 50 mL. Then 250 µL of 2 M NaCl was added. Finally a weighed amount of treated pulp 0.15–0.25 g was added to each beaker. Water was then adjusted to make the total liquid volume (including any added with the pulp sample) to 50 mL. After 1–2 hr mixing the slurry was centrifuged and a portion of the supernatant liquid was titrated with 0.001M polyvinylsulfate, potassium salt (PVSK) from Nalco Chemical Company, Chicago, Ill.).

The amount of polyDADMAC adsorbed is dependent on concentration. At each concentration of polyDADMAC an indicated carboxyl content was recorded and plotted. A best fit line was drawn through the points. The essentially linear portion of the curve was projected and the y-intercept of the line was indicative of the surface carboxyl content.

Figure 5:
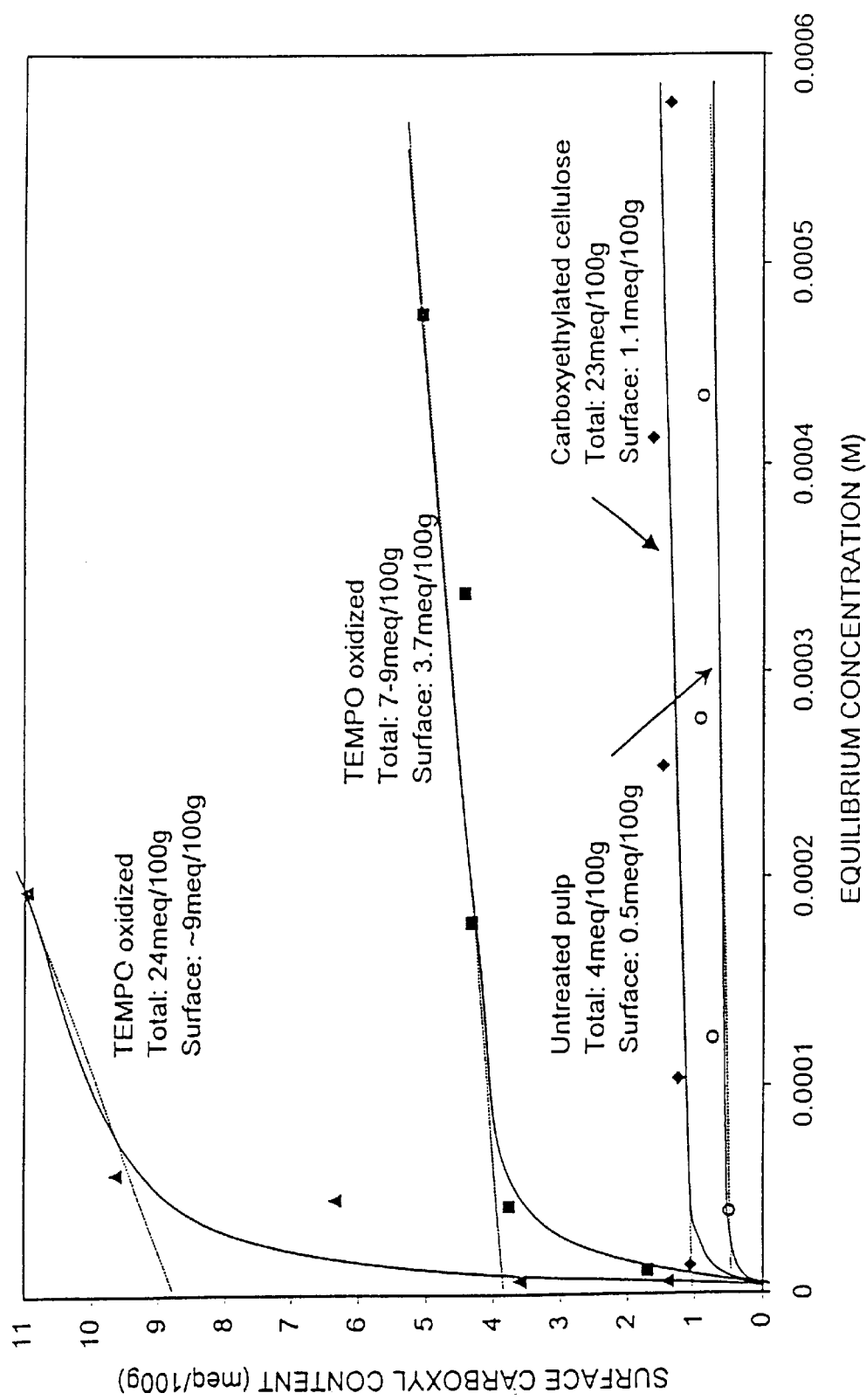
FIG. 5 is a graph showing surface carboxyl content of several fiber samples.

Samples of TEMPO oxidized and $NaBH_4$ reduced northern softwood pulp were prepared according to the procedure of the previous examples. Samples having 7–9, 24, and 97 meq/100 g of carboxyl were tested. Additional tests were run on the untreated pulp and on a carboxylethylated pulp having 23 meq/100 g prepared by the method of aforenoted U.S. Pat. No. 5,667,637. Results are plotted on FIG. 5 and are summarized in Table 3 following.

TABLE 3

| Sample Type | Total Carboxyl, meq/100 g | Surface Carboxyl, meq/100 g | Surface Carboxyl, % |
|---|---|---|---|
| Untreated | 4 | 0.4 | 10 |
| TEMPO Treated | 24 | ~9 | ~37 |
| TEMPO Treated | 7–9 | 3.7 | ~46 |
| TEMPO Treated - Example 5C | 97 | 39 | 40 |
| Carboxyethylated* | 23 | 1.1 | 5 |

*Made according to the procedure described in Example 2, U.S. Pat. No. 5,667,637

Surface carboxylation as indicated by polyDADMAC adsorption should be indicative of adsorption/retention of cationic wet end additives such as cationic starch; cationic wet strength resins such as polyamide-epichlorohydrin, ureaformaldehyde, and melamine-urea-formaldehyde condensation products; and sizing agents such as alkylsuccinic acid and alkyl ketene dimer products. A higher retention of cationic starch will enable higher retention of precipitated calcium carbonate fillers. In addition, higher surface charge and higher retention of cationic additives will lead to faster drainage during sheeting.

EXAMPLE 7

Use of Alternative Oxidizing Agent to Hypochlorite

Buffer solutions were made up using varying amounts of $Na_2HPO_4 \cdot 7H_2O$ and $Na_3PO_4 \cdot 12H_2O$ in 100 mL water to give pH values as follows.

TABLE 4

| Buffer | $Na_2HPO_4 \cdot 7H_2O$, g | $Na_3PO_4 \cdot 12H_2O$, g | pH |
|---|---|---|---|
| A | 1.64 | 0.54 | 11.2 |
| B | 2.44 | 0.07 | 10.2 |
| C | 12.69 | 1.01 | 10.3 |

In similar manner another set of buffer solutions was made up using varying amounts of $NaHCO_3$ and $Na_2CO_3$ in 100 mL water.

TABLE 5

| Buffer | $NaHCO_3$, g | $Na_2CO_3$, g | pH |
|---|---|---|---|
| D | 2.31 | 0.25 | 9.2 |
| E | 0.64 | 0.51 | 9.7 |
| F | 1.11 | 1.73 | 10.0 |

A TEMPO-Stabrex ST70 (Nalco Chemical Co.) oxidation solution was made up using a ratio of 5 mg TEMPO to each 2.5 mL Stabrex. The TEMPO and a small amount of Stabrex were heated in running hot tap water until the TEMPO melted. The mixture was gently agitated until the solution was homogeneous. Then 2.5 g O.D. of a bleached northern softwood pulp was slurried in 100 mL of each of the buffer solutions maintained at 23° C. To this slurry was added at one time 2.5 mL of the TEMPO-Stabrex mixture. However, three samples were made using varying amounts of Stabrex and another to which 50 mg NaBr was added. Oxidation time was 41–45 minutes. The samples were vacuum filtered and washed with deionized water. They were then placed in a solution of 0.16 g $NaBH_4$ in 100 mL water at room temperature for 1 hour and again filtered and washed. Carboxyl content, D.P., and D.P. loss are shown in Table 6.

TABLE 6

Carboxyl Content and D.P. of Stabrex Treated Fiber

| Sample No. | Buffer Used | Buffer pH | Stabrex, mL | Oxidation pH* | Carboxyl, meq/100 g | D.P. | D.P. Loss, % |
|---|---|---|---|---|---|---|---|
| 1 | None | — | 2.5 | 11.4–11.3 | 10 | 1035 | 39 |
| 2 | A | 11.2 | 2.5 | 11.0–10.2 | 17 | 755 | 56 |
| 3 | B | 10.2 | 2.5 | 10.5–9.3 | 23 | 750 | 56 |
| 4 | D | 9.2 | 2.5 | 9.2–9.0 | 23 | 1085 | 36 |
| 5 | F | 10.0 | 2.5 | 10.0–9.9 | 26 | 900 | 47 |
| 6 | C | 10.3 | 2.5 | 10.5–10.3 | 27 | 760 | 55 |
| 7 | E | 9.7 | 2.5** | 10.3–9.9 | 26 | 930 | 45 |
| 8 | E | 9.7 | 0.5 | 9.9–9.8 | 5 | 1375 | 19 |
| 9 | E | 9.7 | 1.0 | 10.0–9.8 | 10 | 1255 | 26 |
| 10 | E | 9.7 | 5.0 | 11.0–10.0 | 52 | 645 | 62 |

*pH measured at the beginning and end of the oxidation period.
**This sample had 50 mg NaBr added to the TEMPO/Stabrex premix. Compare with Sample 5.

It is evident from the above table that Stabrex ST70 is an effective replacement for the NaOCl/NaBr secondary oxidant mixture. The addition of NaBr to the TEMPO/Stabrex mixture does not appear to increase its efficiency.

EXAMPLE 8

Properties of Handsheets Made from Carboxylated Cellulose Fibers

Six samples of carboxylated cellulose were prepared to investigate the effect of carboxyl content on papermaking properties. The samples were prepared by making a buffer solution of 15.1 g $NaHCO_3$ and 12.7 g of $Na_2CO_3$ in 3.9 L of deionized water with 2.1 kg of ice. Into this was dispersed 150 g O.D. of bleached northern kraft softwood market pulp. The slurry pH was 9.7. A TEMPO oxidizing mixture was prepared by admixing 300 mg of TEMPO with 3.0 g NaBr and adding a small amount of 5.25% NaOCl solution. This premix was gently agitated until homogeneous and added to the pulp slurry. The balance of the NaOCl solution was added over several minutes. Varing total amounts of NaOCl solution were used with different batches to produce a set of samples having a spread of carboxyl contents. Four of the six samples of oxidized pulp placed in a reduction solution were with 10 g NaBH$_4$ made up with water to a total slurry weight of 2 kg. Time in the reducing solution varied from 30–45 minutes. Two additional samples were made using only 3.2 g of NaBH$_4$ with the time extended to 2 hours. Treatment conditions, carboxyl content, and D.P. are given in the following Table 7.

TABLE 7

Preparation of Pulps Having a Range of Carboxyl Content

| Sample No. | NaOCl Solution, mL | Time to Washing, min. | NaBH$_4$, g | Reduction Time, min | Carboxyl, meq/100 g | D.P. |
|---|---|---|---|---|---|---|
| T-7 | 38 | 33 | 10 | 32 | 7 | 1670 |
| T-10 | 60 | 17 | 10 | 30 | 11 | 1640 |
| T-15 | 98 | 45 | 10 | 45 | 16 | 1580 |
| T-20 | 135 | 25 | 10 | 30 | 23 | 1560 |
| T-7M | 38 | 49 | 3.2 | 130 | 9 | 1690 |
| T-10M | 60 | 23 | 3.2 | 120 | 12 | 1210 |

The six samples above, along with a sample of carboxyethylated pulp and one of untreated pulp were made into handsheets by TAPPI Method T-205. Sample T-10M was dried before making handsheets. The other samples were not dried following the reduction treatment. The carboxyethylated pulp was the same material used in Example 6. The samples were first refined in a PFI Refiner, available from Mølle, Hanjern, Oslo Norway for the number of revolutions set out below. The gap setting was 1 mm. Freeness was determined as Canadian Standard Freeness (CSF) using a tester available from Robert, Mitchell Co. St. Laurent, Quebec. These results are shown in Table 8 which follows.

TABLE 8

| | Canadian Standard Freeness | | | | | | | |
|---|---|---|---|---|---|---|---|---|
| PFI Revs. | T-7 | T-10 | T-15 | T-20 | T-7M | T-10M | Carboxy-ethylated | Un-treated |
| 0 | 650 | 620 | 635 | 550 | 690 | 700 | 620 | 710 |
| 2000 | 530 | 485 | 480 | 395 | 535 | 560 | 570 | 630 |
| 2000 | 470 | 385 | 395 | 380 | 470 | 485 | 470 | 500 |
| 4000 | 325 | 325 | 320 | 280 | 370 | 370 | 260 | 260 |

Figure 6:
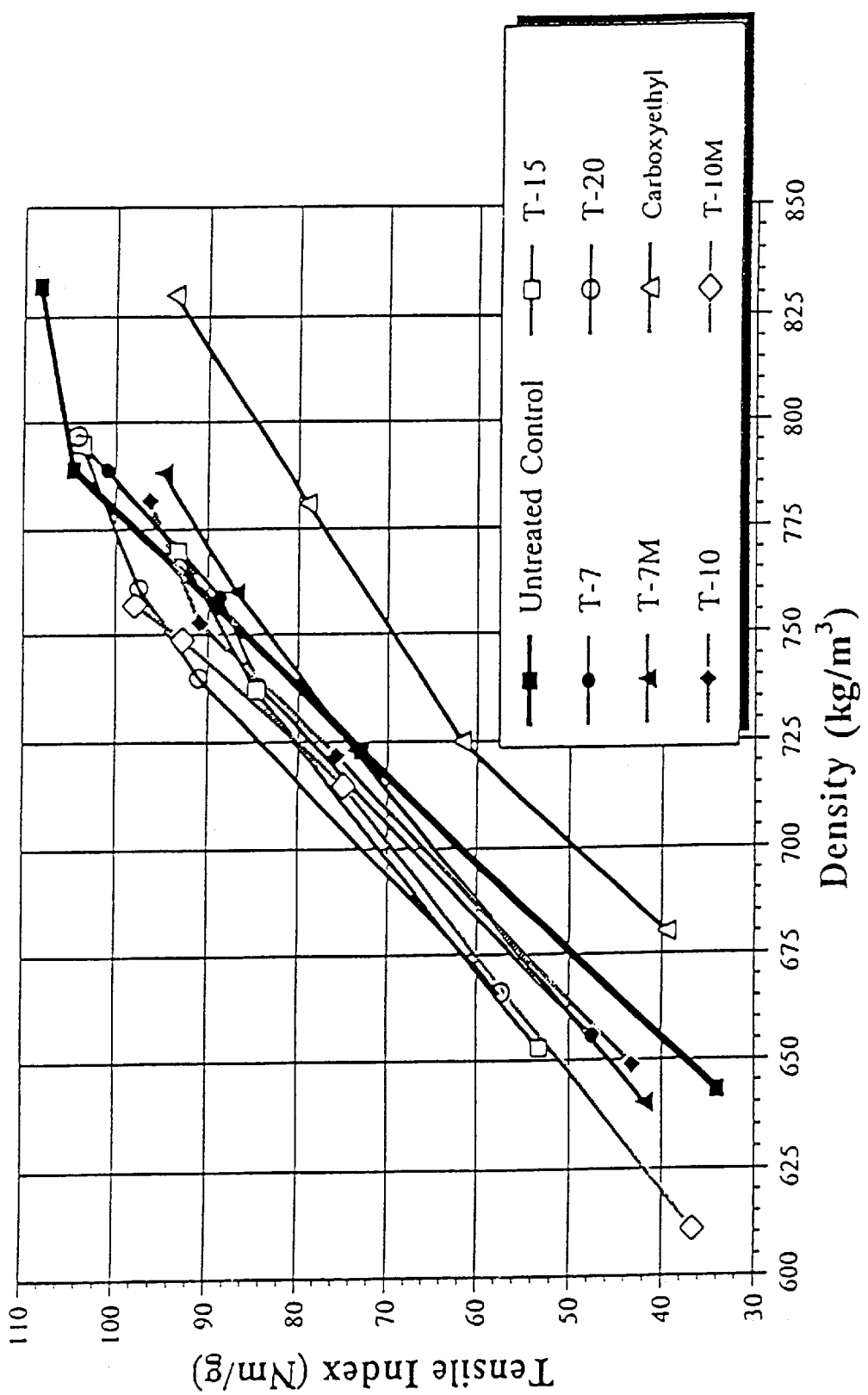
FIG. 6 is a graph plotting tensile index of hand sheets against density.

Handsheets made from each of the samples were evaluated by standard test methods. FIG. 6 is a plot of tensile index against sheet density. At a given density, the carboxyethylated fibers have generally higher tensile index values than the untreated control sheet, the exception being at the high density end where the differences may not be statistically significant. The carboxyethylated fiber is noticably below the control sample over the entire density range.

In all of the examples described to date the carboxylated cellulose will be in the form of a sodium salt. The cation can be changed readily by simple ion exchange; e.g., by treatment with a solution of a soluble calcium salt. Due to the unique properties of these fibers there may be some advantage to replacement of sodium with a divalent cation in that there will be less swelling and a lower water retention value.

EXAMPLE 9

Properties of Sheets Made with Blends of Carboxylated and Untreated Fiber

A. Measurement of Drainage Rate and Preparation of Low Basis Weight Low Density Tissue Handsheets The water used in all steps of these evaluations contained approximately 24 ppm sodium and 35 ppm calcium ions. About 30–31 g of pulp was refined in a PFI Refiner to 570±5 mL Canadian Standard Freeness. Nineteen grams (dry basis) of the refined pulp in a total of 2000 mL of water was placed in a British disintegrator (available as a British Pulp Evaluation Apparatus from Mavis Engineering, Ltd., London, England). 2.28 g of 12.5% Kymene 557H solution was added, and the slurry was disintegrated for 10 minutes. Kymene is a cationic polyamide-epichlorohydrin wet strength resin available from Hercules, Inc., Wilmington, Del. The resulting disintegrated pulp slurry was diluted to 19 L to form a 0.1% consistency slurry. The drainage rate of this slurry was measured by the amount of time taken to pass 300 mL of filtrate water, using a liquid slurry head height of 36 inches, through a 1.0 inch diameter circular handsheet forming wire containing 84×76 wires per inch. The forming wire was obtained from Albany International, 435 Sixth St., Menasha, Wis., 54952.

A 12 inch×12 inch deckle box was used to form handsheets of approximately 26 g/m$^2$ basis weight and approximately 240 kg/m$^3$ density on the forming wire described above. Five sheets were formed for each pulp. The sheets were not wet pressed. Dewatering of the handsheets was accomplished by passing the sheets still on the forming wire over a vacuum slit. The sheets were dried on a steam heated drum dryer and cured in an oven for one hour at 105° C. Wet burst strength of the sheets was measured on a Thwing Albert Model 1300–177 Wet Burst Tester manufactured by Thwing Albert Instrument Co., Philadelphia, Pa., 19154. Eight measurements were made for each pulp and the average calculated and taken as the wet burst strength.

B. Wet Burst Strength and Drainage Rate of Highly Carboxylated Fibers

Pulp Sample 5C from Example 5 was washed with a CaCl$_2$ solution followed by water to produce a highly carboxylated pulp with the cations substantially all calcium, and is designated Sample 5C1. Sample 5C1 was blended with northern softwood bleached kraft market pulp in a ratio of 10% Sample 5C1 and 90% northern softwood bleached kraft. This blend was used in the evaluations as described in Method (A.) above and was compared to a pulp consisting of 100% northern softwood market pulp. The pulp blend containing 10% highly carboxylated fibers showed a 17% decrease in drain time and slightly improved wet burst strength in comparison to the 100% northern softwood market pulp at equal freeness. Results are shown in Table 9.

TABLE 9

| Pulp | Drain Time (seconds) | Wet Burst (g) |
|---|---|---|
| Blend | 166 | 1152 |
| 100% Northern Softwood Market Pulp | 201 | 1136 |

C. Strength Properties of Carboxylated Fibers in Tissue Handsheets

A carboxylated fiber with 7 meq/100 g carboxyl level was prepared according to the procedure of Example 5 from northern softwood bleached kraft market pulp. Tissue handsheets were prepared according to the procedure, described in Method (A.) above, except that all pulps were refined to 470 mL Canadian Standard Freeness. The carboxylated pulp showed significantly higher wet burst and wet burst/dry tensile ratio. Table 10 describes the results obtained.

TABLE 10

| Pulp | Wet Burst (g) | Dry Tensile (Nm/g) |
|---|---|---|
| Carboxylated Northern Softwood Kraft | 1799 | 76.4 |
| Northern Softwood Kraft | 1305 | 65.3 |

EXAMPLE 10

Use of Oxidizers or Oxidizers Followed by Reduction for Stabilization

Aldehyde and carbonyl substituent groups formed on the cellulose molecules during the TEMPO oxidation treatment may also be removed by treatment with certain oxidizing agents. Sodium chlorite is relatively inexpensive and has been found to be very satisfactory as the following example will show. TEMPO oxidized kraft wood pulp was prepared according to Example 1. From this material, samples were used for further treatment, one set for oxidation with sodium chlorite and the other for oxidation with sodium chlorite followed by borohydride reduction.

Technical grade sodium chlorite (0.5 g, 80% $NaClO_2$) was dissolved in a buffer solution of pH 3.6. Impurities in the $NaClO_2$ are known to be 5% $Na_2CO_3$, 2% $NaClO_3$, and 13% NaCl. The buffer was formed using 23.1 mL of 0.4 M acetic acid solution, 3.7 mL of 0.2 M sodium acetate solution, and 60 mL deionized water. 15.6 g, (2.5 g dry weight) of the wet TEMPO oxidized pulp was then added. Treatment was continued for about 3 hours at room temperature (22° C.) and the product was then drained and washed.

To determine whether further stabilization was possible, half of the above stabilized cellulose was slurried in sufficient deionized water to which 0.08 g sodium borohydride was added to make 50 g of the slurry. Reduction was carried out for one hour at room temperature and the product then drained and washed. Analyses of the original pulp, and the three treated samples produced the following results shown in Table 11.

TABLE 11

| Sample | Carbonyl, mM/100 g | Aldehyde, mM/100 g | Ketone, mM/100 g | Carboxyl, mM/100 g | Measured D.P. |
|---|---|---|---|---|---|
| Untreated | 0.0 | — | — | 4 | 1700 |
| TEMPO Oxidized | 14.1 | 12.9 | 1.2 | 25 | 300[1] |
| TEMPO + $NaClO_2$ | 1.2 | — | — | 39 | 760[2] |
| TEMPO + $NaClO_2$ + $NaBH_4$ | 0.0 | — | — | 39 | 1150[1] |

[1] D.P. measured in —COONa form
[2] D.P. measured in —COOH form

It should be noted that in all earlier examples, D.P. was measured with the carboxylated cellulose in the form of a sodium salt. D.P. measured in the free acid form is invariably lower. A rigorous correlation between free acid form D.P. and sodium salt D.P. does not exist, for reasons that are poorly understood. It is believed that, in some cases, there may be some cationic substitution on the carboxyl groups even though the pH at which samples were prepared should normally preclude this. However, there are instances when this explanation does not appear to be fully satisfactory. In all examples following, the form in which D.P was measured will be indicated.

Carbonyl group determination was made by treating the samples with an oximation reagent (hydroxylamine) followed by measurement of nitrogen content.

No attempt was made in this example to optimize reaction conditions. However, it is immediately evident that the sodium chlorite treatment significantly reduced carbonyl substitution. The small residual amount of carbonyl was effectively removed by the subsequent borohydride treatment. D.P. measurement in cuene solvent is one very useful measurement of product stability. Generally, D.P. measured as a sodium salt will be somewhat higher than that when the product is measured in the free acid form. Stability of the above products in the alkaline cuene solvent was markedly improved by the stabilization treatments.

EXAMPLE 11

Oxidative Stabilization at Different Temperatures

In order to further optimize reaction conditions, carboxylated cellulose of Example 1 was treated with sodium chlorite at 40°, 60°, and 80° C. A 2.0 g (dry weight) sample of the TEMPO treated pulp was suspended in a citrate-phosphate buffer at pH 3.0. To the suspension was added 0.17 g of 80% $NaClO_2$ and deionized water to make a total weight of 80 g. The chlorite usage was chosen to be in an approximate 5:1 molar ratio to the assumed aldehyde content of the TEMPO oxidized pulp. Presumed aldehyde content was based on the sample described in Table 11. Oxidation was allowed to proceed for 30 minutes, whereafter the sample was drained and washed. Cuene D.P. measurements were made on the free acid form of the samples and found to be as follows.

| Reaction Temperature, ° C. | D.P. |
|---|---|
| 40 | 745 |
| 60 | 845 |
| 80 | 865 |

Within the time period chosen the 60° C. temperature clearly produced a more stable product. Reaction at 80° C. gave only marginally greater stability.

EXAMPLE 12

Effect of Time on Oxidative Stabilization

To investigate the effect of time on stabilization of the product, a set of experiments was carried out at 70° C. with other conditions similar to those set out in Example 11, except that pH was raised to 3.2. Reaction times were 15, 30, and 60 minutes. As an additional experiment, one set of samples was made with a 10:1 ratio of chlorite to presumed aldehyde content. Results were as follows as seen in Table 12. All samples were converted to the sodium salt (—COONa) prior to D.P. measurement.

TABLE 12

| Reaction Time, min | Ratio of Chlorite:Presumed —CHO | Measured D.P. |
|---|---|---|
| 15 | 5:1 | 1035 |
| 30 | 5:1 | 995 |
| 60 | 5:1 | 995 |

TABLE 12-continued

| Reaction Time, min | Ratio of Chlorite:Presumed —CHO | Measured D.P. |
|---|---|---|
| 30 | 10:1 | 985 |
| 60 | 10:1 | 1080 |

It is apparent that, under the present conditions, an extended reaction time does not result in significantly greater D.P. stabilization. Presumably the oxidation reaction has moved to near completion within the first 15–30 minutes.

EXAMPLE 13

Effect of Sodium Chlorite Concentration and Consistency on Stabilization

Another set of experiments was made to determine whether solution concentration of sodium chlorite and fiber consistency had a significant effect on D.P. stability. Conditions, except as noted in Table 8 which follows, were similar to those described in Example 12.

TABLE 13

| Sodium Chlorite, g/L | Ratio $NaClO_2$: —CHO | Sample Consistency, % | Measured D.P. —COOH | Measured D.P. —COONa |
|---|---|---|---|---|
| 1.6 | 5.0 | 2.5 | 715 | 1025 |
| 3.2 | 5.0 | 5.0 | 790 | 1035 |
| 6.4 | 5.0 | 10.0 | 905 | 1120 |
| 9.6 | 20.0 | 5.0 | 1000 | 1175 |

D.P. shows a linear relationship with sodium chlorite concentration in the aqueous reaction medium when measured either on the sodium salt or the free acid form of the product. The increasingly higher concentration of sodium chlorite in the aqueous phase resulted in the higher measured D.P.

Example 14

Effect of pH on Oxidative Stabilization with Sodium Chlorite

A set of samples was made similar to those of Example 12 except that pH was changed in four steps between 2.8 and 4.0. Results are seen in Table 14.

TABLE 14

| Oxidation Reaction pH | Measured D.P. —COOH | Measured D.P. —COONa |
|---|---|---|
| 2.8 | 735 | 1010 |
| 3.2 | 715 | 995 |
| 3.6 | 805 | 970 |
| 4.0 | 840 | 975 |

EXAMPLE 15

Properties of Hand Sheets Made with Oxidatively Stabilized Carboxylated Cellulose A carboxylated fiber with 10 meq/100 g carboxyl level was prepared according to the procedure of Example 10 from the same northern bleached softwood kraft market pulp except that the chlorite stabilization was carried out at room temperature overnight (about 16 hours). Tissue handsheets were prepared according to the procedure described in Method (A.) of Example 9, except that all pulps were refined to 530 mL Canadian Standard Freeness. The carboxylated pulp showed a significantly higher wet burst and wet burst/dry tensile ratio as seen in Table 15.

TABLE 15

| Pulp Sample | Wet Burst, g | Dry Tensile, Nm/g |
|---|---|---|
| Northern softwood kraft | 1280 | 67.5 |
| Carboxylated northern softwood kraft | 1832 | 78.2 |

EXAMPLE 16

Synthesis of the 4-ethylene acetal of 2,2,6,6-tetramethyl-4-piperidone-1-oxy Free Radical To a solution of 8 g 2,2,6,6-tetramethyl-4-piperidone (I) in 350 mL toluene was added 10.65 g p-toluenesolfonic acid (II) and 16.00 g ethylene glycol (III) in a 500 mL round bottom flask with a Dean-Stark trap and a condenser.

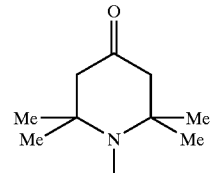

I

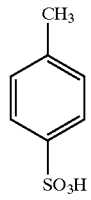

II

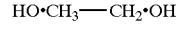

III

HO·CH₃—CH₂·OH

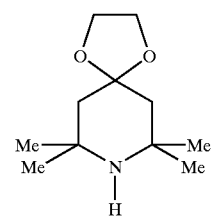

IV

The mixture was magnetically stirred under an atmosphere of nitrogen and refluxed for 12 hours until no more water accumulated in the Dean-Stark trap. The reaction mixture was cooled and toluene removed on a rotary evaporator at 70° C. The mixture was then poured into a separatory funnel with 300 mL chloroform and washed four times with a 150 mL of a saturated aqueous solution of $Na_2CO_3$ followed by four washes with 100 mL deionized water. The chloroform solution was dried over anhydrous $Na_2SO_4$, evaporated on the rotary evaporator, and dried on the vacuum pump to give a red-brown liquid. $^1H$ and $^{13}C$ nuclear magnetic resonance spectra confirmed the structure as being 2,2,6,6-tetramethyl-4-piperidone4-ethylene acetal (IV). The yield was 9.86 g.

7.0 Grams of the compound made above, along with 1.00 g $K_2CO_3$, 0.46 g sodium tungstate, 0.53 g EDTA, and 100 mL of 30% $H_2O_2$ were placed in a 250 mL round bottom flask and stirred at room temperature for 45 h. The aqueous solution was extracted with 200 mL $CHCl_3$. The chloroform solution was washed twice with 150 mL water, dried over anhydrous $Na_2SO_4$, and evaporated on a rotary evaporator to give a red oil that crystallized in the freezer at about −10° C. Crystallization from pentane gave red needles (V) having a melting point of 47°–48° C.

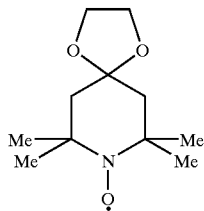

To 3 mL of a solution of 0.25 g (V) in methanol was added a solution of 0.75 g ascorbic acid in 4 mL of methanol. The red solution of the nitroxide turned colorless. The methanol solution was evaporated to dryness on the rotary evaporator. The residue was taken in 10 mL $CHCl_3$ and washed twice with 3 mL of a saturated aqueous solution of $Na_2CO_3$ followed by two washes with 3 mL water. The $CHCl_3$ solution was dried over anhydrous $Na_2SO_4$, filtered and evaporated on a rotary evaporator to give an off-white solid. Recrystallization from pentane gave a white crystalline solid with a melting point of 88–90° C. $^1H$ NMR, $^{13}C$ NMR, and IR spectra confirm hydroxylamine structure VI.

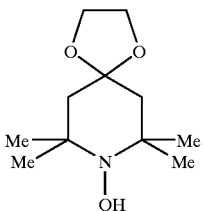

EXAMPLE 17

Screening of Various Nitroxides for Effectiveness as Primary Oxidants of Cellulose Eleven representative cyclic nitroxide compounds were screened for effectiveness as primary oxidants for cellulose, using a procedure generally similar to that outlined in Example 1. The cellulose pulp used was Type NB416, a bleached kraft southern pine market pulp obtained from Weyerhaeuser Company, New Bern, N.C. This pulp has an α-cellulose content of about 86–88% and hemicellulose of about 10–12%. 25 g of the pulp (oven dry basis) was slurried in water and the pH adjusted to 9.7 with the $Na_2CO_3$/$NaHCO_3$ buffer of Example 1. To the slurry was added 0.32 mmmol of the nitroxide oxidant, 0.50 g NaBr, and 25 g of ~6% NaOCl solution. Unless otherwise noted the nitroxide and NaOCl and NaBr were prereacted as in Example 1. The oxidation was carried out for 30 minutes at about 25° C., after which the samples were water washed and tested for carboxyl content (see Table 16). A second series of samples were prepared as above but with the initial oxidation reaction at 0° C. After washing these samples were stabilized by treatment with 6.0 g $NaClO_2$ and 6.0 g of $H_2O_2$ for 24 hours at room temperature and pH 3.5. Results of the samples receiving the oxidative stabilization are given in Table 17.

TABLE 16

Carboxyl content of unstabilized samples

| Nitroxide Composition | Carboxyl Content, meq/100 g |
|---|---|
| Untreated fiber | ~3.5 |
| TEMPO | 11.4[1] |
| 4-hydroxy-TEMPO | 6.1 |
| 4-hydroxy-TEMPO[2] | 5.3 |
| 4-hydroxy-TEMPO[3] | 7.3 |
| 4-methoxy-TEMPO | 10.4 |
| 4-benzoxy-TEMPO | 9.2 |
| 4-amino-TEMPO | 4.4 |
| 4-oxo-TEMPO[3] | 7.1 |
| 4-oxo-TEMPO-ethylene acetal | 9.3 |
| 4-oxo-TEMPO-ethylene acetal[4] | 10.1 |
| 4-acetylamino-TEMPO | 15.3 |

[1]Average of duplicate samples
[2]2.5 hour oxidation time
[3]No prereaction of nitroxide with NaOCl
[4]1.0 hr oxidation time

TABLE 17

Carboxyl content of stabilized samples

| Nitroxide Composition | Carboxyl Content, meq/100 g |
|---|---|
| Untreated fiber | ~3.5 |
| TEMPO | 30.6[2] |
| 4-methoxy-TEMPO | 31.0 |
| 4-oxo-TEMPO-ethylene acetal | 30.3[2] |
| 4-oxo-TEMPO-propylene acetal | 23.0 |
| 4-oxo-TEMPO-neopentyl acetal | 17.9 |
| 4-acetylamino-TEMPO | 32.0 |
| TEMMO[1] | 29.8 |

[1]3,3,5,5-tetramethylmorpholine-1-oxo free radical
[2]Average of duplicate samples All of the compositions tested were effective as primary oxidants and none presented any particular difficulties in use.

The inventors having herein set out their best mode of practicing their invention, it will be apparent to those skilled in the art that many variations are possible that have not been described in the examples. It is their intent that these variations should be included within the scope of the invention if they are encompassed within the following claims.

What is claimed is:

1. A method of making a stable fibrous carboxylated cellulose suitable as a papermaking fiber which comprises:
   oxidizing cellulose fibers selected from the group consisting of bleached and unbleached kraft wood pulps, prehydrolyzed kraft wood pulps, sulfite wood pulps, and mixtures thereof in which the α-cellulose content does not exceed about 90% by reacting them in an aqueous alkaline suspension with a sufficient amount of a primary oxidant selected from the group consisting of heterocyclic nitroxides stable under aqueous alkaline conditions in which the carbon atoms adjacent the nitroxide nitrogen lack hydrogen substitution, the corresponding oxammonium salts, amines, and hydroxylamines of these compounds, and mixtures thereof, and a sufficient amount of a secondary oxidant to induce an increase in carboxyl substitution in the cellulose of at least 2 meq/100 g; and
   protecting the carboxylated fibers against degree of polymerization (D.P.) loss by further treating them in aqueous suspension with a stabilizing agent selected from the group consisting of reducing agents and tertiary oxidizing agents, the reducing agents being selected from the group consisting of alkali metal borohydrides, cyanoborohydrides, and mixtures thereof, and the tertiary oxidizing agents being selected from the group consisting of alkali metal chlorites, permanganates, chromic acid, bromine, silver oxide, chlorine dioxide, hydrogen peroxide, and mixtures thereof, in order to remove any cellulose substituents which tend to cause molecular chain breakage.

2. The method of claim 1 in which the nitroxides have a six membered ring structure with di-lower alkyl substitution on each carbon atom adjacent the nitroxide.

3. The method of claim 2 in which the nitroxides are compositions having the structure

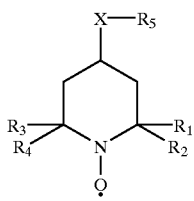

in which $R_1$–$R_4$ are one to four carbon alkyl groups but $R_1$ with $R_2$ and $R_3$ with $R_4$ may together be included in a five or six carbon alicyclic ring structure, X is sulfur or oxygen, and $R_5$ is hydrogen, $C_1$–$C_{12}$ alkyl, benzyl, 2-dioxanyl, a dialkyl ether, an alkyl polyether, or a hydroxyalkyl, and X with $R_5$ being absent may be hydrogen or a mirror image moiety to form a bipiperidinyl nitroxide.

4. The method of claim 3 in which the nitroxide is 2,2,6,6-tetramethylpiperidinyl-1-oxy free radical.

5. The method of claim 3 in which the nitroxide is 2,2,2',2',6,6,6',6'-octamethyl-4,4'-bipiperidinyl-1,1'-dioxy di-free radical.

6. The method of claim 3 in which the nitroxide is 2,2,6,6-tetramethyl-4-hydroxypiperidinyl-1-oxy free radical.

7. The method of claim 3 in which the nitroxide is 2,2,6,6-tetramethyl-4-methoxypiperidinyl-1-oxy free radical.

8. The method of claim 3 in which the nitroxide is 2,2,6,6-tetramethyl-4-benzyloxypiperidinyl-1-oxy free radical.

9. The method of claim 2 in which the nitroxides are compositions having the structure

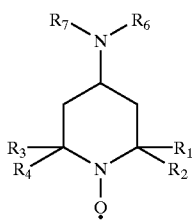

in which $R_1$–$R_4$ are one to four carbon alkyl groups but $R_1$ with $R_2$ and $R_3$ with $R_4$ may together be included in a five or six carbon alicyclic ring structure, and $R_6$ is hydrogen or $C_1$–$C_5$ alkyl, and $R_7$ is hydrogen, $C_1$–$C_8$ alkyl, phenyl, carbamoyl, alkyl carbamoyl, phenyl carbamoyl, or $C_1$–$C_8$ acyl.

10. The method of claim 9 in which the nitroxide is 2,2,6,6-tetramethyl-4-aminopiperidinyl-1-oxy free radical.

11. The method of claim 9 in which the nitroxide is 2,2,6,6-tetramethyl-4-acetylaminopiperidinyl-1-oxy free radical.

12. The method of claim 2 in which the nitroxides are compositions having the structure

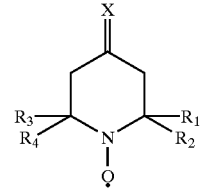

In which $R_1$–$R_4$ are one to four carbon alkyl groups but $R_1$ with $R_2$ and $R_3$ with $R_4$ may together be included in a five or six carbon alicyclic ring structure, and X is oxygen, sulfur, NH, N-alkyl, NOH, or $NO_8$ where $R_8$ is lower alkyl.

13. The method of claim 3 in which the nitroxide is 2,2,6,6-tetramethyl-4-piperidone-1-oxy free radical.

14. The method of claim 2 in which the nitroxides are compositions having the structure

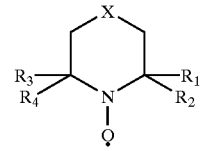

wherein $R_1$–$R_4$ are one to four carbon alkyl groups but $R_1$ with $R_2$ and $R_3$ with $R_4$ may be linked into a five or six carbon alicyclic ring structure, X is oxygen, sulfur, -alkyl amino, or acyl amino.

15. The method of claim 14 in which the nitroxide is 3,3,5,5-tetramethylmorpholine-1-oxy free radical.

16. The method of claim 2 in which the nitroxides are compositions having the structure

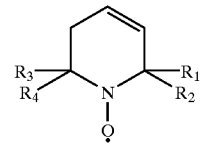

wherein $R_1$–$R_4$ are one to four carbon alkyl groups but $R_1$ with $R_2$ and $R_3$ with $R_4$ may be linked into a five or six carbon alicyclic ring structure.

17. The method of claim 16 in which the nitroxide is 3,4-dehydro-2,2,6,6,-tetramethylpiperidinyl-1-oxy free radical.

18. The method of claim 2 in which the nitroxides are compositions having the structure

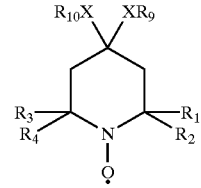

wherein $R_1$–$R_4$ are one to four carbon alkyl groups but $R_1$ with $R_2$ and $R_3$ with $R_4$ may together be included in a five or six carbon alicyclic ring structure, X is methylene, oxygen, sulfur, or alkylamino, and $R_9$ and $R_{10}$ are one to five carbon alkyl groups and may together be included in a five or six member ring structure, which, in turn, may contain one to four substituent groups.

19. The method of claim 18 in which each X is oxygen, the oxygen atoms being linked by a two to three carbon alkyl chain to form a cyclic acetal substituent.

20. The method of claim 19 in which the nitroxide composition is the ethylene cyclic acetal of 2,2,6,6-tetramethyl-4-piperidone-1-oxy free radical.

21. The method of claim 19 in which the nitroxide composition is the propylene cyclic acetal of 2,2,6,6-tetramethyl-4-piperidone-1-oxy free radical.

22. The method of claim 19 in which the nitroxide composition is the neopentyl cyclic acetal of 2,2,6,6-tetramethyl-4-piperidone-1-oxy free radical.

23. The method of claim 1 in which the nitroxides have a five atom ring structure with 2,2,5,5 lower alkyl substitution.

24. The method of claim 23 in which the nitroxides are compositions having the structure

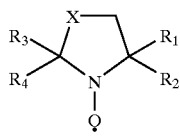

in which $R_1$–$R_4$ are one to four carbon alkyl groups but $R_1$ with $R_2$ and $R_3$ with $R_4$ may together be included in a five or six carbon alicyclic ring structure, and X may be methylene, sulfur, oxygen, —NH, or $NR_{11}$, in which $R_{11}$ is a lower alkyl.

25. The method of claim 24 in which the nitroxide composition is 2,2,5,5-tetramethylpyrrolidinyl-1-oxy free radical.

26. The method of claim 1 in which the secondary oxidant is a hypohalite salt.

27. The method of claim 26 in which the hypohalite salt is sodium hypochlorite.

28. The method of claim 26 in which the hypohalite salt is formed by an admixture of sodium hypochlorite and sodium bromide.

29. The method of claim 26 in which the primary oxidant and hypohalite salt are premixed in the presence of water, whereupon the mixture is added to a buffered suspension of cellulose fibers in water.

30. The method of claim 29 in which the fiber suspension is buffered to a pH between about 8–11 during the oxidizing reaction.

31. The method of claim 30 in which the fiber suspension is buffered to a pH between about 9–10 during the oxidizing reaction.

32. The method of claim 1 in which the primary oxidant is present in a range of 0.005–1.0% based on weight of cellulose present.

33. The method of claim 32 in which the primary oxidant is present in the range of 0.02–0.25% based on weight of cellulose present.

34. The method of claim 1 in which the secondary oxidant is present in the range of 0.5–35% based on weight of cellulose present.

35. The method of claim 34 in which the secondary oxidant is present in the range of 1.3–10.5% based on weight of cellulose present.

36. The method of claim 1 in which the initial oxidation step is carried out for a time between 1 minute and about 10 hours.

37. The method of claim 1 in which the reducing agent stabilizes the product by substantially converting any aldehyde or ketone carbonyl substituents to hydroxyl groups.

38. The method of claim 1 in which the carboxyl substitution is raised between about 2–150 meq/100 g over the carboxyl content of the starting cellulose.

39. The method of claim 1 in which the reducing agent is present in the aqueous suspension in a concentration of about 0.1–100 g/L.

40. The method of claim 39 in which the reducing agent is present in the aqueous suspension in a concentration of about 0.25–5 g/L.

41. The method of claim 37 in which the reduction reaction proceeds for a time of at least 10 minutes.

42. The method of claim 41 in which the reduction reaction proceeds for a time between 10 minutes and 2 hours.

43. The method of claim 1 by substantially converting any aldehyde substituents to additional carboxyl groups.

44. The method of claim 43 which comprises further stabilizing the carboxylated cellulose fibers after treatment with the tertiary oxidizing agent by treatment with a reducing agent.

45. The method of claim 43 in which the tertiary oxidant is selected from the group consisting of alkali metal chlorites, a chlorine dioxide/hydrogen peroxide mixture, and mixtures thereof.

46. The method of claim 43 in which the tertiary oxidant is a mixture of chlorine dioxide and hydrogen peroxide.

47. The method of claim 23 in which the tertiary oxidant is sodium chlorite.

48. The method of claim 47 in which the sodium chlorite is present during the stabilization reaction in a concentration of 0.001–0.20 grams sodium chlorite per gram of fiber.

49. The method of claim 48 in which the sodium chlorite is present during the stabilization reaction in a concentration of 0.01–0.09 grams of sodium chlorite per gram of fiber.

50. The method of claim 43 in which the tertiary oxidant is present in the aqueous suspension during the stabilization reaction in a molar ratio of 5–10 times the presumed aldehyde substitution on the carboxylated cellulose.

51. The method of claim 43 in which the oxidation during the stabilization reaction proceeds for a time between 5 minutes and 50 hours.

52. The method of claim 51 in which the oxidation during the stabilization reaction proceeds for a time between 10 minutes and 2 hours.

53. The method of claim 44 in which the tertiary oxidizing agent is sodium chlorite and the reducing agent is sodium borohydride.

54. The method of claim 43 in which the oxidative stabilization treatment is carried out under acidic conditions at a pH between about 1.5–5.

55. The method of claim 54 in which the oxidative stabilization treatment is carried out under acidic conditions at a pH between about 2–4.

56. The method of claim 1 in which the cellulose fiber is recycled secondary fiber.

57. A method of making a stable fibrous carboxylated cellulose suitable as a papermaking fiber which comprises:
  oxidizing cellulose fibers selected from the group consisting of bleached and unbleached kraft wood pulps, prehydrolyzed kraft wood pulps, sulfite wood pulps, and mixtures thereof in which the α-cellulose content does not exceed about 90% by reacting them in an aqueous alkaline suspension with a sufficient amount of a primary oxidant selected from the group consisting of nitroxides stable under aqueous alkaline conditions and having the composition

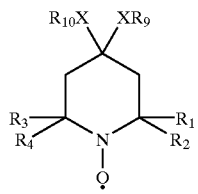

wherein $R_1$–$R_4$ are one to four carbon alkyl groups but $R_1$ with $R_2$ and $R_3$ with $R_4$ may together be included in a five or six carbon alicyclic ring structure, X is methylene, oxygen, sulfur, or alkylamino, and $R_9$ and $R_{10}$ are one to five carbon alkyl groups and may together be included in a five or six member ring structure, which, in turn, may contain one to four substituent groups, the corresponding oxammonium compounds, amines, and hydroxylamines of these nitroxides, and mixtures thereof, and a sufficient amount of a secondary oxidant to induce an increase in carboxyl substitution in the cellulose of at least 2 meq/100 g; and protecting the carboxylated fibers against degree of polymerization (D.P.) loss by further treating them in aqueous suspension with a stabilizing agent selected from the group consisting of reducing agents and tertiary oxidizing agents, the reducing agents being selected from the group consisting of alkali metal borohydrides, cyanoborohydrides, and mixtures thereof, and the tertiary oxidizing agents being selected from the group consisting of alkali metal chlorites, permanganates, chromic acid, bromine, silver oxide, chlorine dioxide, hydrogen peroxide, and mixtures thereof, in order to remove any cellulose substituents which tend to cause molecular chain breakage.

58. The method of claim 57 in which each X is oxygen, the oxygen atoms being linked by a two to three carbon alkyl chain to form a cyclic acetal substituent.

59. The method of claim 58 in which the cyclic acetal is selected from the group consisting of the ethylene, propylene, and neopentyl acetals of 2,2,6,6-tetramethyl-4-piperidone-1-oxy free radicals and mixtures thereof.

60. The method of claim 59 in which the nitroxide composition is the ethylene cyclic acetal of 2,2,6,6-tetramethyl-4-piperidone-1-oxy free radical.

61. The method of claim 59 in which the nitroxide composition is the propylene cyclic acetal of 2,2,6,6-tetramethyl-4-piperidone-1-oxy free radical.

62. The method of claim 59 in which the nitroxide composition is the neopentyl cyclic acetal of 2,2,6,6-tetramethyl-4-piperidone-1-oxy free radical.

63. A method of making a stable fibrous carboxylated cellulose suitable as a papermaking fiber which comprises:

oxidizing cellulose fibers selected from the group consisting of bleached and unbleached kraft wood pulps, prehydrolyzed kraft wood pulps, sulfite wood pulps, and mixtures thereof in which the α-cellulose content does not exceed about 90% by reacting them in an aqueous alkaline suspension with a sufficient amount of a primary oxidant selected from the group consisting of heterocyclic nitroxides stable under aqueous alkaline conditions in which the carbon atoms adjacent the nitroxide nitrogen lack hydrogen substitution, the corresponding oxammonium salts, amines, and hydroxylamines of these compounds, and mixtures thereof, and a sufficient amount of a secondary oxidant to induce an increase in carboxyl substitution in the cellulose of at least 2 meq/100 g; and protecting the carboxylated fibers against degree of polymerization (D.P.) loss by further treating them in aqueous suspension with a tertiary oxidizing stabilizing agent selected from the group consisting of alkali metal chlorites, permanganates, chromic acid, bromine, silver oxide, chlorine dioxide, hydrogen peroxide, and mixtures thereof in order to remove any cellulose substituents which tend to cause molecular chain breakage.

64. The method of claim 63 in which the heterocyclic nitroxide has the composition

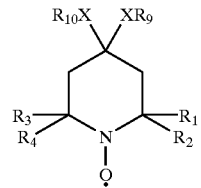

wherein $R_1$–$R_4$ are one to four carbon alkyl groups but $R_1$ with $R_2$ and $R_3$ with $R_4$ may together be included in a five or six carbon alicyclic ring structure, X is methylene, oxygen, sulfur, or alkylamino, and $R_9$ and $R_{10}$ are one to five carbon alkyl groups and may together be included in a five or six member ring structure, which, in turn, may contain one to four substituent groups, the corresponding oxammonium compounds, amines, and hydroxylamines of these nitroxides, and mixtures thereof.

* * * * *